(12) United States Patent
Zhang et al.

(10) Patent No.: US 9,158,970 B2
(45) Date of Patent: Oct. 13, 2015

(54) DEVICES, SYSTEMS, AND METHODS FOR VISUAL-ATTRIBUTE REFINEMENT

(71) Applicant: CANON KABUSHIKI KAISHA, Tokyo (JP)

(72) Inventors: Liyan Zhang, Irvine, CA (US); Juwei Lu, Oakville (CA); Bradley Scott Denney, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 14/077,079

(22) Filed: Nov. 11, 2013

(65) Prior Publication Data

US 2014/0140625 A1    May 22, 2014

Related U.S. Application Data

(60) Provisional application No. 61/727,564, filed on Nov. 16, 2012, provisional application No. 61/727,602, filed on Nov. 16, 2012.

(51) Int. Cl.
*G06K 9/46*    (2006.01)
*G06K 9/00*    (2006.01)

(52) U.S. Cl.
CPC ........ *G06K 9/00677* (2013.01); *G06K 9/00288* (2013.01)

(58) Field of Classification Search
CPC ..... G06K 9/0075; G06K 9/46; G06K 9/4652; G06K 9/6202; G06K 9/6224; G06K 9/6253; G06T 9/0002; G06T 11/60; G06F 17/30244; G06F 17/30247; G06F 17/3025; G06F 17/30256; G06F 17/30259; G06F 17/30262; G06F 17/30265; G06F 17/30267; G06F 17/30274; G06F 17/3028; H04N 5/765; H04N 5/772; H04N 5/907; H04N 9/8205; G09G 5/14; G09G 5/395; G09G 2340/10; G09G 2380/16; G06Q 30/02; G06Q 30/0603; G06Q 30/0625; G06Q 30/0643; G06Q 30/08; Y10S 707/949
See application file for complete search history.

(56) References Cited

U.S. PATENT DOCUMENTS 7,379,568 B2    5/2008    Movellan
7,379,627 B2    5/2008    Li
(Continued)

FOREIGN PATENT DOCUMENTS

CN    101216879    7/2008
WO    WO2012104830    8/2012

OTHER PUBLICATIONS

Walter J. Scheirer et al., Multi-Attribute Spaces: Calibration for Attribute Fusion and Similarity, CVPR, Jun. 2012.
Jianxin Wu, Power Mean SVM for Large Scale Visual Classification, CVPR, Jun. 2012.
Felix X. Yu et al., Weak Attributes for Large-Scale Image Retrieval, CVPR, Jun. 2012.
Bao-hua Yuan et al., Face recognition based on completed local binary pattern, Application Research of Computers, Apr. 2012.
(Continued)

*Primary Examiner* — Jose Couso
(74) *Attorney, Agent, or Firm* — Canon U.S.A., Inc. IP Division

(57) ABSTRACT

Systems, devices, and methods for generating attribute scores obtain a plurality of object images; generate a respective first attribute score of a first attribute for each object image in the plurality of object images based on the object images; calculate a respective pairwise object-similarity measure for pairs of object images in the plurality of object images; and refine the first attribute score of an object image in the plurality of object images based at least in part on the attribute scores of other object images in the plurality of object images and on the object-similarity measures of the pairs of object images in the plurality of object images.

20 Claims, 15 Drawing Sheets

(56) References Cited

U.S. PATENT DOCUMENTS

| | | | |
|---|---|---|---|
| 7,519,200 | B2 | 4/2009 | Gokturk |
| 7,555,148 | B1 | 6/2009 | Steinberg |
| 7,564,994 | B1 | 7/2009 | Steinberg |
| 7,587,068 | B1 | 9/2009 | Steinberg |
| 7,643,658 | B2 | 1/2010 | Kilner |
| 7,657,100 | B2 * | 2/2010 | Gokturk et al. ............... 382/209 |
| 7,657,126 | B2 * | 2/2010 | Gokturk et al. ............... 382/305 |
| 7,873,189 | B2 | 1/2011 | Jee |
| 7,961,986 | B1 * | 6/2011 | Jing et al. ....................... 382/305 |
| 8,111,923 | B2 | 2/2012 | Csurka |
| 8,180,112 | B2 | 5/2012 | Kurtz |
| 8,194,938 | B2 | 6/2012 | Wechsler |
| 8,200,010 | B1 * | 6/2012 | Jing et al. ....................... 382/173 |
| 8,212,834 | B2 * | 7/2012 | Bogart et al. ................. 345/581 |
| 8,233,676 | B2 | 7/2012 | Ngan |
| 8,311,293 | B2 | 11/2012 | Okada |
| 8,356,035 | B1 * | 1/2013 | Baluja et al. .................. 707/741 |
| 8,406,483 | B2 | 3/2013 | Zhang |
| 8,477,207 | B2 | 7/2013 | Karimoto |
| 8,494,233 | B2 | 7/2013 | Kaneda |
| 2004/0179719 | A1 | 9/2004 | Chen |
| 2005/0105780 | A1 | 5/2005 | Ioffe |
| 2011/0085739 | A1 | 4/2011 | Zhang |
| 2011/0188713 | A1 | 8/2011 | Chin |
| 2013/0070973 | A1 | 3/2013 | Saito |
| 2013/0108123 | A1 | 5/2013 | Hwang |

OTHER PUBLICATIONS

Xiangxin Zhu et al., Face Detection, Pose Estimation, and Landmark Localization in the Wild, CVPR, Jun. 2012.

Timo Ahonen et al., Face Description with Local Binary Patterns: Application to Face Recognition, Jun. 2006.

Jia Deng et al., Hedging Your Bets: Optimizing Accuracy-Specificity Trade-offs in Large Scale Visual Recognition, IEEE Conference on Computer Vision and Pattern Recognition (CVPR), Jun. 2012.

Kun Duan et al., Discovering Localized Attributes for Fine-grained Recognition, IEEE Conference on Computer Vision and Pattern Recognition (CVPR), Jun. 2012.

Pedro F. Felzenszwalb et al., Object Detection with Discriminatively Trained Part Based Models, IEEE Transactions on Pattern Analysis and Machine Intelligence, vol. 32, Issue: 9, Sep. 2010.

Brendan J. Frey et al., Clustering by Passing Messages Between Data Points, Feb. 16, 2007 vol. 315 Science.

Sarah Perez, KLIK, The Face-Detecting iPhone App, Heads Into Production, Techcrunch, May 10, 2012.

Sarah Perez, Lambda Labs Is Launching a Facial Recognition API for Google Glass, Techcrunch, May 23, 2013.

Sarah Perez, Recognizr: Facial Recognition Coming to Android Phones, www.readwrite.com, Feb. 24, 2010.

MOBIO, Welcome to MOBIO (Mobile Biometry), www.mobioproject.org, Sep. 11, 2013.

Ferdin Joe J et al., Enhanced Face Recognition System Using Contextual Dissimilarity Measure and Parse Graph, Proceedings of the International Conference, Computational Systems and Communication Technology, May 5, 2010.

Francois Fleuret et al., Coarse-to-Fine Face Detection, International Journal of Computer Vision, Jan. 2001, vol. 41, Issue 1-2, pp. 85-107.

Abhinav Shrivastava et al., Constrained Semi-Supervised Learning Using Attributes and Comparative Attributes, 12th European Conference on Computer Vision, Oct. 7-13, 2012, Proceedings, Part III.

Girish Kulkarni et al., Baby Talk: Understanding and Generating Image Descriptions, CVPR 2011, Jun. 2011.

Abhishek Kumar et al., A Co-training Approach for Multi-view Spectral Clustering, Proceedings of the 28th International Conference on Machine Learning, Jun. 2011.

Neeraj Kumar et al., Describable Visual Attributes for Face Verification and Image Search, IEEE Transactions on Pattern Analysis and Machine Intelligence, Mar. 2011.

Abhishek Kumar et al., Co-regularized Multi-view Spectral Clustering, NIPS 2011, Dec. 2011.

Christoph H. Lampert et al., Learning to Detect Unseen Object Classes by Between-Class Attribute Transfer, CVPR 2009, Jun. 2009.

Jingen Liu et al., Recognizing Human Actions by Attributes, CVPR 2011, Jun. 2011.

Juwei Lu et al., Regularization studies of linear discriminant analysis in small sample size scenarios with application to face recognition, Pattern Recognition Letters 26, Jan. 2005.

Ricardo Martin, Attributes, University of Washington, Oct. 2011.

Devi Parikh et al., Relative Attributes, ICCV 2011, Nov. 2011.

Olga Russakovsky et al., Attribute learning in large-scale datasets, ECCV 2010, Sep. 2010.

Behjat Siddiquie et al., Image Ranking and Retrieval based on Multi-Attribute Queries, CVPR 2011, Jun. 2011.

Ying-li Tian et al., IBM Smart Surveillance System (S3): Event Based Video Surveillance System with an Open and Extensible Framework, Machine Vision and Applications, Oct. 2008, vol. 19, Issue 5-6, pp. 315-327.

Felix X. Yu et al., Experiments of Image Retrieval Using Weak Attributes, Columbia University Computer Science Department Technical Report # CUCS 005-12, Apr. 2012.

Chunhui Zhu et al, A Rank-Order Distance based Clustering Algorithm for Face Tagging, CVPR 2011, Jun. 2011.

V. Athitsos et al., Boosting nearest neighbor classifiers for multiclass recognition, Computer Vision and Pattern Recognition—Workshops, Jun. 2005.

J. Bala et al., Using Learning to Facilitate the Evolution of Features for Recognizing Visual Concepts, Evolutionary Computation, Aug. 1996, vol. 4, No. 3, pp. 297-311.

George Bebis; CS 479/679 Pattern Recognition—Spring 2006, Dimensionality Reduction; University of Nevada, Reno; Mar. 2006.

Zhimin Cao et al., Face Recognition with Learning-based Descriptor, CVPR 2010, Jun. 2010.

Roberto M. Cesar Jr. et al., Inexact Graphmatching for Model-Based Recognition: Evaluation and Comparison of Optimization Algorithms, Pattern Recognition 38, May 2005, 2099-2113.

Chi-Ho Chan et al., Multi-Scale Local Binary Pattern Histograms for Face Recognition, Lecture Notes in Computer Science vol. 4642, Aug. 2007, pp. 809-818.

Ronald R. Coifman et al., Diffusion maps, Appl. Comput. Harmon. Anal. 21, Jun. 2006, 5-30.

Bruce Draper et al., Recognizing faces with PCA and ICA, Computer Vision and Image Understanding 91, Feb. 2003, 115-137.

Ali Farhadi et al., Describing Objects by their Attributes, CVPR 2009, Jun. 2009.

Rogerio Feris et al., Attribute-based Vehicle Search in Crowded Surveillance Videos, ICMR '11, Apr. 2011.

Vittorio Ferrari et al., Learning Visual Attributes, Advances in Neural Information Processing Systems, Dec. 2007.

Brendan Klare et al., On Matching Forensic Sketches to Mugshot Photos, IEEE Transactions on Pattern Analysis and Machine Intelligence, Mar. 2011.

D. Parikh et al., Relative Attributes, 2011 IEEE International Conference on Computer Vision (ICCV), Nov. 2011.

N.B. Salehi et al., Face Recognition Using Boosted Regularized Linear Discriminant Analysis, ICCMS '10, Second International Conference on Computer Modeling and Simulation, Jan. 2010.

W. J. Scheirer et al., How Reliable are Your Visual Attributes?, Proc. of SPIE vol. 8712, May 2013.

Linlin Shen et al., A review on Gabor wavelets for face recognition, Pattern Analysis and Applications, vol. 9, Issue 2-3, pp. 273-292, Oct. 2006.

Zhidong Wang et al., Subspace regularized linear discriminant analysis for small sample size problems, PRICAI'12 Proceedings of the 12th Pacific Rim international conference on Trends in Artificial Intelligence, pp. 661-672, Sep. 2012.

Junping Zhang et al., Ensemble-Based Discriminant Manifold Learning for Face Recognition, Advances in Natural Computation, Lecture Notes in Computer Science, vol. 4221, Sep. 2006, pp. 29-38.

* cited by examiner

| Examples of Human Attributes | |
|---|---|
| female | infant |
| male | middle age |
| light brown hair | old |
| dark brown hair | hat |
| blonde hair | coat |
| black hair | tie |
| red hair | skirt |
| brown eyes | dress |
| blue eyes | uniform |
| green eyes | business dress |
| glasses | business casual dress |
| tatoos | casual dress |
| scars | watch |
| light complexion | earrings |
| fair complexion | necklace |
| medium complexion | tall |
| olive complexion | average height |
| tan complexion | short |
| brown complexion | clothing top color |
| dark brown complexion | clothing bottom color |

| Examples of Vehicle Attributes | |
|---|---|
| 2-door | tractor |
| 4-door | 2 axles |
| hatchback | 3 axles |
| microcar | 4 axles |
| compact car | more than 4 axles |
| mid-size car | occupied |
| full size car | top color |
| pickup truck | bottom color |
| sports car | 1 trailer |
| station wagon | 2 trailers |
| van | more than 2 trailers |
| SUV | cargo truck |
| motorcycle | tires |
| bus | metal tracks |

FIG. 12

| Examples of Luggage Attributes ||
|---|---|
| hat box | horizontal design, hard shell |
| courier bag/box/package | upright design, soft material |
| art portfolio | horizontal design, soft shell |
| tube | upright design, hard material |
| cosmetic case | briefcase |
| kennel/pet container | zippers |
| ice chest | no zippers |
| tool/tackle box | document case |
| golf bag | duffle bag |
| child seat | laundry bag |
| child stroller | cardboard box |
| baggage trolley | plastic container |
| laptop bag | backpack/rucksack |
| wheels | no wheels |
| retractable handles | no retractable handles |

FIG. 13

DEVICES, SYSTEMS, AND METHODS FOR VISUAL-ATTRIBUTE REFINEMENT

CROSS-REFERENCE TO RELATED APPLICATIONS

This application claims priority to U.S. Provisional Application No. 61/727,564, which was filed on Nov. 16, 2012, and to U.S. Provisional Application No. 61/727,602, which was filed on Nov. 16, 2012.

BACKGROUND

1. Technical Field

This description generally relates to visual analysis of images.

2. Background

In the field of image analysis, people have attempted to design systems that can recognize people and objects in image data. The image data can take many forms, for example video sequences, views from multiple cameras, data in spectrums of light that are not visible to the human eye, and multi-dimensional data from a computational camera.

SUMMARY

In one embodiment, a method comprises obtaining a plurality of object images; generating a respective first attribute score of a first attribute for each object image in the plurality of object images based on the object images; calculating a respective pairwise object-similarity measure for pairs of object images in the plurality of object images; and refining the first attribute score of an object image in the plurality of object images based at least in part on the attribute scores of other object images in the plurality of object images and on the object-similarity measures of the pairs of object images in the plurality of object images.

In one embodiment, a system comprises a computer-readable storage medium; and one or more processors that are coupled to the computer-readable storage medium and that are configured to cause the system to generate respective attribute scores of a plurality of attributes for each object image in a plurality of object images based on the object images, generate respective pairwise object-similarity measures for pairs of object images in the plurality of object images, and generate refined attribute scores of the object images based on the attribute scores of the object images in the plurality of object images and on the object-similarity measures of the pairs of object images in the plurality of object images.

In one embodiment, one or more computer-readable storage media store instructions that, when executed by one or more computing device, cause the one or more computing devices to perform operations that comprise generating respective attribute scores of a plurality of attributes for each object image in a plurality of object images based on the object images; generating respective pairwise object-similarity measures for pairs of object images in the plurality of object images; and generating refined attribute scores of the object images based on the attribute scores of the object images in the plurality of object images and on the object-similarity measures of the pairs of object images in the plurality of object images.

BRIEF DESCRIPTION OF THE DRAWINGS

FIG. 12 illustrates examples of attributes.

FIG. 13 illustrates examples of attributes.

DESCRIPTION

The following disclosure describes certain explanatory embodiments. Other embodiments may include alternatives, equivalents, and modifications. Additionally, the explanatory embodiments may include several novel features, and a particular feature may not be essential to some embodiments of the devices, systems, and methods described herein.

Figure 1:
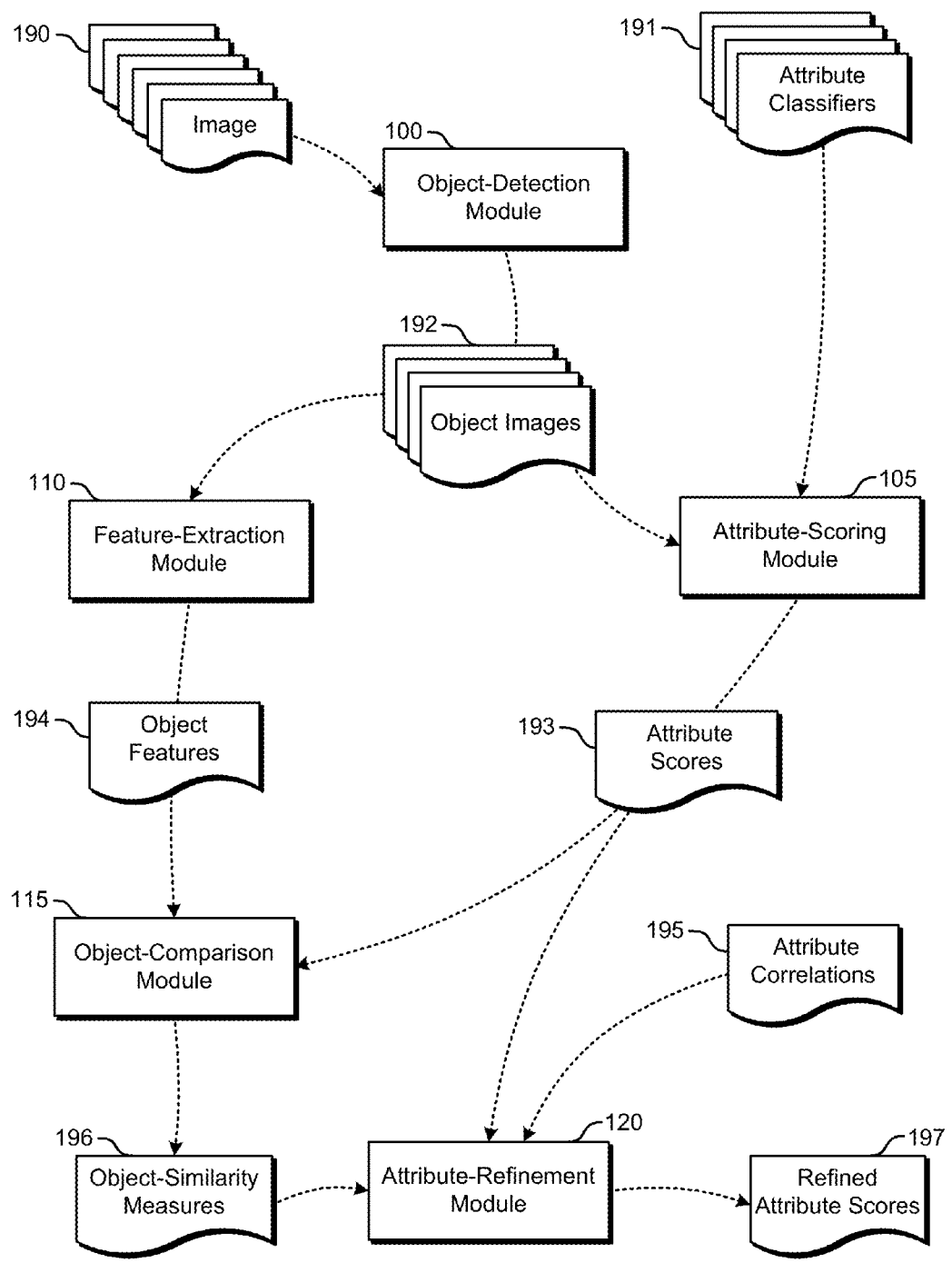
FIG. 1 illustrates an example embodiment of the flow of operations in a system for refining image attributes.

FIG. 1 illustrates an example embodiment of the flow of operations in a system for refining visual attributes. For purposes of explanation, FIG. 1 shows only certain modules, although the system includes other components. Modules include logic, computer-readable data, or computer-executable instructions, and may be implemented in software (e.g., Assembly, C, C++, C#, Java, BASIC, Perl, Visual Basic), hardware (e.g., customized circuitry), and a combination of software and hardware. In some embodiments, the system includes additional or fewer modules, the modules are combined into fewer modules, or the modules are divided into more modules. Though the computing device or computing devices that execute a module perform the operations, for purposes of description a module may be described as performing one or more operations.

Also, although the objects are faces in some of the example embodiments that are described herein, in some embodiments the objects are other objects (e.g., buildings, vehicles, animals, plants, landmarks, rocks, fabric).

A visual attribute is representation that can be detected by machines, understood by humans, and shared across categories, and a visual attribute may describe scenes, categories, or objects. Also, visual attributes may be useful in a variety of applications, including image recognition, image classification, attribute-based image search, and image description. A visual-attribute score 193 (also referred to herein as an "attribute score") indicates the confidence of a corresponding attribute being found in an object image 192. Examples of visual attributes are listed in Table 1:

TABLE 1

Examples of Attributes

| | | | | |
|---|---|---|---|---|
| 'Male' | 'Curly Hair' | 'Arched Eyebrows' | 'No Beard' | 'Mouth Wide Open' |
| 'Asian' | 'Wavy Hair' | 'Brown Eyes' | 'No Eyewear' | 'Teeth Not Visible' |
| 'White' | 'Straight Hair' | 'Bags Under Eyes' | 'Eyeglasses' | 'Smiling' |
| 'Black' | 'Receding Hairline' | 'Big Nose' | 'Sunglasses' | 'Frowning' |
| 'Indian' | 'Bangs' | 'Pointy Nose' | 'Wearing Necktie' | 'Attractive Man' |
| 'Baby' | 'Fully-Visible Forehead' | Big Lips' | 'Wearing Necklace' | 'Attractive Woman' |
| 'Child' | 'Partially-Visible Forehead' | 'High Cheekbones' | 'Wearing Earrings' | 'Blurry' |
| 'Youth' | 'Obstructed Forehead' | 'Rosy Cheeks' | 'Wearing Hat' | 'Harsh Lighting' |
| 'Middle Aged' | 'Shiny Skin' | 'Round Jaw' | 'Wearing Lipstick' | 'Flash' |
| 'Senior' | 'Pale Skin' | 'Double Chin' | 'Heavy Makeup' | 'Soft Lighting' |
| 'Bald' | 'Oval Face' | 'Strong Nose-Mouth Lines' | 'Flushed Face' | 'Outdoor' |
| 'Black Hair' | 'Square Face' | 'Mustache' | 'Narrow Eyes' | 'Color Photo' |
| 'Blond Hair' | 'Round Face' | 'Sideburns' | 'Eyes Open' | 'Posed Photo' |
| 'Brown Hair' | 'Chubby' | 'Goatee' | 'Mouth Closed' | |
| 'Gray Hair' | 'Bushy Eyebrows' | '5 o" Clock Shadow' | 'Mouth Slightly Open' | |

Also, FIG. 12 and FIG. 13 illustrate additional examples of attributes.

The system attempts to correct or to improve the accuracy of visual-attribute scores 193 and object-similarity measures 196 (e.g., object-similarity scores, an object-similarity graph), for example, by increasing an object-similarity score if the two faces in a pair of faces come from the same person and decreasing the object-similarity score if the two faces in a pair of faces come from different people. Also, because the visual-attribute scores 193 may be useful for generating the object-similarity measures 196 and because the object-similarity measures 196 may be useful for generating the visual-attribute scores 193, the improvements of the visual-attribute scores 193 and the object-similarity measures 196 may be linked together, for example by joint learning.

First, the visual-attribute scores 193 may be useful for generating object-similarity measures 196. For example, the gender attribute value can easily discriminate two faces in spite of their similar appearance, and thus some visual-attribute scores can link together object images of the same person even though the appearances of the person in the images differ due to environmental variations.

Second, the object-similarity measures 196 may be useful for generating the visual-attribute scores 193. For example, the attribute scores 193 of some attributes that are extracted from several images of a person's face should be consistent (e.g., gender, ethnicity), and inconsistent attribute scores 193 would reveal potential errors. Accordingly, the system can refine the attribute scores 193 of one object image based on the attribute scores 193 of similar object images, which may be indicated by the object-similarity measures 196 (e.g., Euclidean distance in an object-similarity graph, for example in an Eigenspace learned from the object images). Thus, if the gender of a target face is predicted to be female according to one or more of its attribute scores 193, and if most of the most-similar neighbor faces are estimated to be male according to one or more of their attribute scores 193, then the target face should have a higher probability of being male.

Furthermore, correlations between attributes can also be used to refine the attribute scores. For example, Asian people usually have black hair, women and babies usually do not have moustaches and beards, etc. Likewise, a face with a moustache or a beard should usually be a mature man, which indicates a strong correlation between the attributes 'moustache' and 'man' and also a strong correlation between 'moustache' and 'age'.

Additionally, from the description of an attribute, the sensitivity of the attribute can be analyzed with respect to time. For example, some of the attributes are stable, such as gender, ethnicity, etc., because usually the values of these attributes will never change in the whole life of a person; some attributes are persistent, such as age, glasses, facial traits, and hair traits, because the values of these attributes are stable in a short time period; and some attributes are transient, like expression, because people can change the values of these attributes in an instant. Hence, transient attributes are often not useful for determining facial similarities. Also, stable and persistent attributes should be strongly correlated in images of the same person. Therefore, some embodiments of the systems, devices, and methods described herein consider only stable attributes, persistent attributes, or both, because the scores of these attributes are assumed to be consistent for the same person within a relevant time frame. Accordingly, some embodiments of the system perform attribute-score refinement based on attribute correlations.

Thus, if m object images $(f_1, f_2, \ldots, f_m)$ are obtained, embodiments of the system perform one or more of the following general tasks: (1) improve the quality of the attribute scores 193 (e.g., in an attribute-score vector $A^{f_p}$) originally generated using the attribute classifiers 191, and (2) improve the quality of the object-similarity measures 196 (e.g., an object-similarity score $S_{pq}$ for the two faces in each pair of faces $f_p$ and $f_q$).

The system of FIG. 1 includes one or more computing devices that include an object-detection module 100, an attribute-scoring module 105, a feature-extraction module 110, an object-comparison module 115, and an attribute-refinement module 120. The object-detection module 100 detects and extracts one or more object images 192 from one or more obtained images 190. Some embodiments of the object-detection module 100 detect faces and their fiducial points in the images 190 and make affine alignments. For example, some embodiments apply a face-detector toolkit, and this toolkit also returns the locations of several fiducial locations, such as the centers of the eyes and the mouth. These fiducial points can be used to align object images.

Also, the feature-extraction module 110 obtains the object images 192 and extracts object features 194 from the object images 192. The object features 194 may be low-level visual features and may be represented by many different types of descriptors, such as Gabor filter features, HSV features, local binary pattern (LBP) features, SIFT features, SURF features, etc. Due to the high dimensionality of many low-level visual features, a dimensionality reduction technique (e.g., PCA) can be applied to reduce the dimensionality of the features.

Figure 2:
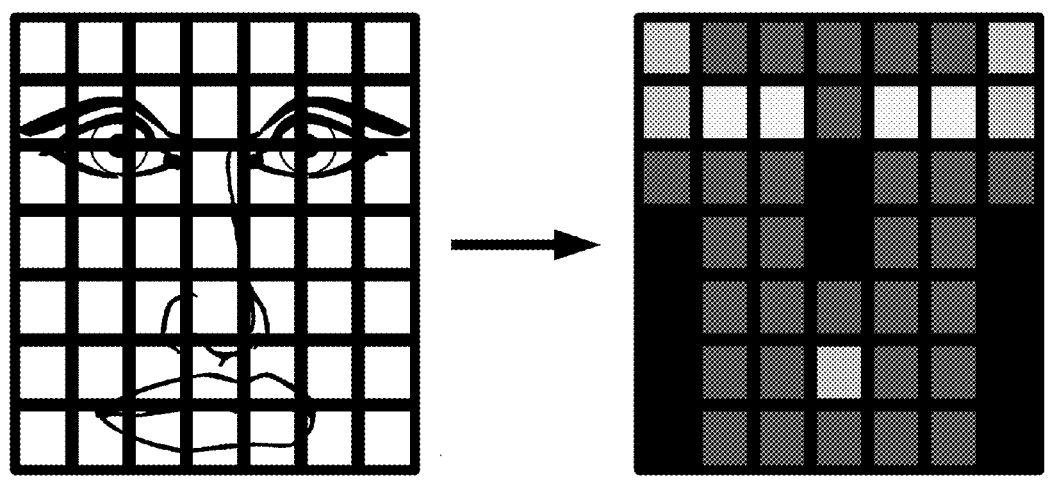
FIG. 2 shows an example embodiment of a face image that has been divided into weighted regions.

Some embodiments of the feature-extraction module 110 use an LBP operator, which assigns a label to every pixel of an image by comparing the 3×3 neighborhood of each pixel with the center pixel value and considering the result to be an 8-bit binary string. The 8-bit binary string is converted to a decimal value falling in [0, 255]. The decimal value could be considered a label, and then the histogram of the labels can be used as a texture descriptor. In embodiments that use an LBP operator to describe faces, an object image 192 is divided into n×n rectangular regions, and an LBP descriptor is extracted in each region. Since the respective significances of different regions differ when detecting facial similarities, some embodiments assign distinct weights to different regions. FIG. 2 shows an example embodiment of an object image 192 that has been divided into weighted regions. As shown in FIG. 2, the object image 192 is divided into 7×7 regions, and the weights of the different regions are diverse (the lighter the color is, the higher the weight that is assigned to the region).

Additionally, the attribute-scoring module 105 obtains the object images 192 and generates respective attribute scores 193 for the object images 192 based on the object images 192 and attribute classifiers 191. The attribute classifiers 191 are trained to score visual attributes. For example, in some embodiments the attribute classifiers 191 are trained to score human visual attributes from faces, such as "black hair", "big nose", "wearing eyeglasses", etc. The attribute classifiers 191 may be, for example, SVM classifiers, neural networks classifiers, or decision tree classifiers that predict visual attributes (e.g., ethnicity, facial traits, accessories, photo quality). Some embodiments train an SVM classifier for each attribute by constructing a large training dataset through downloading a massive collection of object images and manually labeling the ground truth of the images. Then the low-level visual features of the objects are extracted and are used as inputs to train the SVM classifiers. Once the attribute classifiers 191 are trained, they can be used to generate the attribute scores 193 for new object images 192.

The object-comparison module 115 obtains the object features 194 and, in some embodiments, the attribute scores 193, and generates object-similarity measures 196 (e.g., an object-similarity graph, object-similarity scores) based on one or more of the obtained object features 194 and visual-attribute scores 193. To generate the object-similarity measures 196, the object-comparison module 115 determines respective similarities between the two objects (e.g., faces, buildings, vehicles) in pairs of objects based on their visual-feature similarities or other information. For example, in embodiments where the object features 194 of an object image 192 are represented by a set of LBP descriptors, an object-similarity score (which is an example of an object-similarity measure 196) for two objects can be obtained by computing weighted distances between the LBP descriptors of the object images 192. Also, some embodiments use another similarity measurement, for example cosine distance. In addition, context information (e.g., image-capture time, location, image sequence, object co-occurrence, tracking information) can also be used to compute the object-similarity measures 196 of the object images 192. For example, sequential photos that were captured within a short time frame may be more likely to depict the same objects, like sequential photos of a birthday party. Thus, object-similarity measures 196 can be generated based on object features 194, as well as other information (e.g., context information).

For object-similarity measures 196, some embodiments generate object-similarity scores (e.g., facial-similarity scores) and an object-similarity graph 𝔾 (e.g., a facial-similarity graph 𝔾). Also, a matrix S defines the similarities between all the object pairs (e.g., face pairs), with each element $S_{pq}$ indicating the similarity between object image $f_p$ and object image $f_q$. The object-similarity graph 𝔾 contains m nodes, with each node representing one of the m object images 192, and with each edge representing the similarity between the objects of the corresponding object pair.

Figure 3:
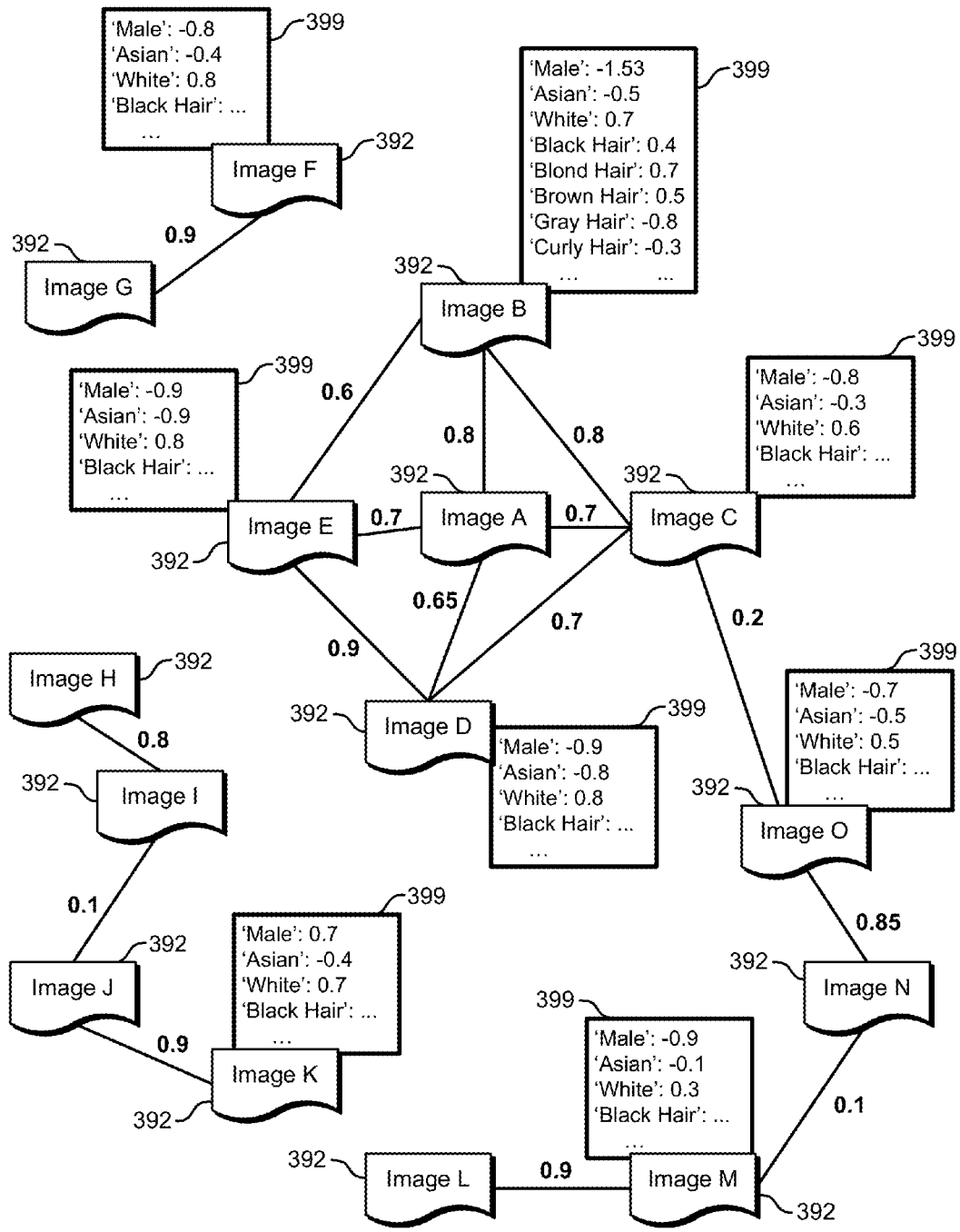
FIG. 3 illustrates an example embodiment of an object-similarity graph.

FIG. 3 illustrates an example embodiment of an object-similarity graph 𝔾. The edge values between object nodes $f_p$ 392, which represent the object images 192, denote their similarities. Also, each object node $f_p$ 392 has been assigned a respective attribute-score vector $A^{f_p}$ 399 that contains the attribute scores of the respective object image 192. The initial values of the attribute scores in the attribute-score vector $A^{f_p}$ 399 are obtained from the attribute classifiers 191. In one example, the attribute-score vector $A^{f_p}$ 399 is a 73-dimensional vector (73 attributes), with each element of the attribute-score vector $A_i^{f_p}$ 399 indicating the value of the $i^{th}$ attribute for the object image 192 that corresponds to the object node $f_p$ 392. Also, some embodiments do not explicitly generate an object-similarity graph 𝔾, but instead use object-similarity scores without generating an object-similarity graph 𝔾.

Referring again to FIG. 1, the attribute-refinement module 120 obtains the object-similarity measures 196, attribute correlations 195, and, in some embodiments, the attribute scores 193. The attribute correlations 195 describe one or more of the correlations of an attribute in an image to the same attribute in another image (e.g., the gender of a person in one image to the gender of the same person in another image, the facial expression of a person in an image to the facial expression of the same person in another image), the correlations of an attribute of an image to other attributes of the same image (e.g., gender and facial hair of a person in one image), and the correlations of an attribute of an image to other attributes of other images (e.g., gender and facial hair of a person in one image to gender and facial hair to the same person in another image). The attribute-refinement module 120 generates refined attribute scores 197 for an object image 192 (e.g., refines the attribute-score vector 399 of an object node 392) based on one or more of the object-similarity measures 196 (e.g., attribute-score vectors 399 of similar object nodes 392, which have edge values within a certain range or threshold in an object-similarity graph 𝔾), on the attribute scores 193, and on the attribute correlations 195.

For example, in some embodiments, the visual-attribute score $A_i^{f_p}$ of the $i^{th}$ attribute for a particular object $f_p$ will be influenced by the score $A_i^{f_q}$ of the $i^{th}$ attribute of other objects $f_q(1 \leq q \leq N)$. The influence of another object $f_q$ is determined by the similarities of the other object $f_q$ to the particular object $f_p$. Another object $f_q$ that has a higher similarity score $S_{qp}$ will have a stronger influence. In some embodiments, the other object $f_q$ must have a similarity score $S_{qp}$ that meets or exceeds a threshold to have an influence. The similarity score $S_{qp}$ may be normalized, and $S_{qp}$ refers to the normalized similarity score:

$$\hat{S}_{qp} = S_{qp} \Big/ \left( \sum_q S_{qp} \right). \tag{1}$$

In some embodiments, the similarity score $S_{qp}$ or the normalized similarity score $\hat{S}_{qp}$ is used to define the edge values in an object-similarity graph 𝔾. Additionally, some embodiments of the attribute-refinement module 120 refine the score $A_i^{f_p}$ of the $i^{th}$ attribute for a particular object image $f_p$ according to the following:

$$A_i^{f_p} \leftarrow \alpha \sum_{\forall q \neq p} A_i^{f_q} \hat{S}_{qp} + (1-\alpha) A_i^{f_p}. \quad (2)$$

In equation (2), the attribute score $A_i^{f_p}$ of an object image $f_p$ is updated in two parts. One part is influenced by the other connected object images $f_q$ based on their normalized similarity scores $\hat{S}_{qp}$, and the other part is a value of the attribute score $A_i^{f_p}$ that is independent of other object images $f_q$. The parameter $\alpha$ determines the weights of the two parts, which can be selected through cross validation. The parameter $\alpha$ may be used to select how strongly correlated the attribute score $A_i^{f_p}$ of an object image $f_p$ is to the attribute scores $A_i^{f_q}$ of other object images $f_q$.

In addition to relationships between the scores of the same attribute in different images (e.g., between attribute score $A_i^{f_p}$ and attribute score $A_i^{f_q}$), some different attributes, and thus their respective attribute scores, are highly correlated. For example, Asian people usually have black hair. So a face with a larger "Asian" attribute score tends to have a higher "black hair" attribute score. Also, some of the attributes conflict, for example "baby" and "senior". A face cannot be a baby and a senior at the same time, so a large score of one attribute will imply a low or negative score of the other attribute. These correlations, which may be included in the attribute correlations 195, can also be used by the attribute-refinement module 120 to generate the refined-attribute scores 197.

If A denotes the attribute scores 193 (e.g., the attribute-score vector 399) for an object image 192 (or its object node 392), with each element $A_i$ denoting the score of the $i^{th}$ attribute, and if $\mathcal{P}$ denotes the affinity matrix between the attributes (also referred to herein as the "attribute affinity matrix $\mathcal{P}$"), with each element $\mathcal{P}_{ij}$ indicating the probability of the presence of the $i^{th}$ attribute with the presence of the $j^{th}$ attribute, then $\mathcal{P}_{ij}$ can be expressed as $\mathcal{P}_{ij}$=Prob $(A_i>0|A_j>0)$. The value of $\mathcal{P}_{ij}$ may be learned, for example by statistical analysis using Bayesian principles, or may be predefined, for example by considering domain knowledge (e.g., an infant does not have a mustache).

Using the attribute affinity matrix $\mathcal{P}$, the attribute-refinement module 120 may refine the attribute score $A_i$ of the $i^{th}$ attribute based on the attribute scores $A_j$ of correlated attributes according to the following iterative equation, where $\beta$ is the parameter that indicates the influence factor of the correlated attributes. Generally, $$A_i^{(t)} = \beta \sum_j A_j^{(t-1)} P_{ij} + (1-\beta-\gamma) A_i^{(t-1)} + \gamma A_i^{(0)}. \quad (3)$$

This indicates that the $i^{th}$ attribute score $A_i$ is determined by the score of its correlated attributes, as well as its own value. The parameters $\beta$ and $\gamma$ determine the weights of the three parts. Thus for each object image $f_p$, the attribute-refinement module 120 can perform equation (3) to refine the attribute scores 193 (e.g., the attribute-score vector A 399) of the object image $f_p$. This process may repeat one or more times according to the value of t. In some embodiments, the above operations can be implemented according to $$A_i^{(t)} = \beta \sum_j A_j^{(t-1)} P_{ij} + \gamma A_i^{(0)}. \quad (3b)$$

In these embodiments the term $(1-\beta-\gamma)A_i^{(t-1)}$ is incorporated into the term $\mathcal{P}_{ii}$. For example, $\mathcal{P}_{ii}=(1-\beta-\gamma)/\beta$. Also, in some embodiments the entries in the attribute affinity matrix $\mathcal{P}$ contain both positive and negative values. Furthermore, the non-diagonal elements of the attribute affinity matrix $\mathcal{P}$ could be learned from a collection of attribute-labeled data as regression coefficients that estimate an attribute score using the other attribute scores. Moreover, in addition to the above linear embodiments of attribute refinement, non-linear methods could also be used to refine attribute scores based on other attribute scores of the same image and based on the attribute scores of similar images.

In some embodiments, due to the correlation of the attributes, the attribute scores (e.g., attribute-score vector A 399) are first projected to an attribute sub-space (e.g., using PCA or ICA) and then re-constructed back to the original attribute space, thereby filtering the cross-attribute noise and making the reconstructed attribute scores more consistent.

Thus, the attribute-refinement module 120 may leverage object similarities and attribute correlations to generate refined attribute scores 197. Also, some embodiments of the attribute-refinement module 120 generate the refined attribute scores 197 by implementing attribute-refinement operations that account for both the object-similarity measures 196 and the attribute correlations 195, for example according to the following:

$$\begin{cases} A_i^{f_p}(0) = \ddot{A}_i^{f_p} & (4) \\ A_i^{f_p}(2t-1) = \alpha \sum_{f_q \to f_p} A_i^{f_q}(2t-2)\hat{S}_{qp} + (1-\alpha)A_i^{f_p}(0) \\ A_i^{f_p}(2t) = \beta \sum_j A_j^{f_p}(2t-1)P_{ij} + (1-\beta-\gamma)A_i^{f_p}(2t-1) + \gamma A_i^{f_p}(0). \end{cases}$$

These operations iteratively refine the score $A_i^{f_p}$ of the $i^{th}$ attribute for a particular object $f_p$ (e.g., a face). In the beginning, the initial score $A_i^{f_p}(0)$ is assigned according to the original attribute score $\ddot{A}_i^{f_p}$, which is obtained from the attribute classifier according to the first sub-equation. In the following t iterations (and each iteration t may refer to one or more iterations), the attribute score $A_i^{f_p}$ of the $i^{th}$ attribute of a particular object image $f_p$ is updated to a revised attribute score $A_i^{f_p}(1)$, which is described by the $2^{nd}$ sub-equation, based on the initial attribute score $A_i^{f_p}(0)$ and on the attribute scores $A_i^{f_q}$ of the $i^{th}$ attribute of other object images $f_q$ that are similar to the particular object image $f_p$. Also, in the next iteration, the $3^{rd}$ sub-equation uses correlated attribute scores $A_j^{f_p}$ to refine the attribute score $A_i^{f_p}$ (the order of performing the $2^{nd}$ and $3^{rd}$ sub-equations may be changed in some embodiments). The operations that implement the $2^{nd}$ and $3^{rd}$ sub-equations may also be repeated for t=2, 3, . . . , n, for example (for n total iterations). Thus, the attribute score $A_i^{f_p}$ of the $i^{th}$ attribute for a particular object $f_p$ can be refined iteratively based on object-similarity measures and on attribute correlations. For each attribute, these operations can be performed to generate the corresponding refined attribute score 197.

Some embodiments of the attribute-refinement module 120, which operate in an attribute sub-space X, generate refined attribute scores 197 according to the following:

$$\begin{cases} X_i^{f_p}(0) = F\ddot{A}_i^{f_p} & (4b) \\ X_i^{f_p}(t) = \alpha \sum_{f_q \to f_p} X_i^{f_q}(t-1)\hat{S}_{qp} + (1-\alpha)X_i^{f_p}(0) \\ A_i^{f_p}(n) = (F^T F)^{-1} F^T X_i^{f_p}(n), \end{cases}$$

where F is the sub-space projection matrix which projects the attribute score $Ä_i^{f_p}$ to an attribute subspace X to generate the projected attribute score $X_i^{f_p}$, and the iteration is carried out over a projection matrix to update the projected subspace X attribute score. In the last operation, after n iterations, the refined attribute score $A_i^{f_p}(n)$ 197 is reconstructed in the original space.

However, in some situations, the attribute scores 193 and the refined attribute scores 197 cannot be directly leveraged in other applications, for example face verification, attribute-based object search, etc., due to the diverse distributions of different attribute scores 193 or refined attribute scores 197. Hence, the attribute scores 193 or the refined attribute scores 197 may be normalized, for example by the attribute-refinement module 120. Also, attribute scores 193 or refined attribute scores 197 may be mapped into attribute-score probabilities. For example, the refined attribute scores 197 for each object may be fit to a Weibull distribution, and the cumulative density function (CDF) may be directly used to define the attribute-score probabilities. Once the parameters k and λ are found from the Weibull fitting, the CDF can be computed. Thus, the $i^{th}$ attribute-score probability $AP_i^{f_p}$ of object $f_p$ can be computed according to $$AP_i^{f_p} = F(A_i^{f_p}; k_{p,i}, \lambda_{p,i}) = 1 - e^{-\left(\frac{A_i^{f_p}}{\lambda_{p,i}}\right)^{k_{p,i}}} \quad (5)$$

By fitting attribute scores 193 or refined attribute scores 197 into a Weibull distribution, the CDF can be used as the normalized attribute scores 193 or the normalized refined attribute scores 197. Also, the obtained attribute-score probabilities $AP^{f_p}$ may be the refined attribute-score probabilities for object $f_p$. Thus, in some embodiments, the refined attribute scores 197 include the attribute-score probabilities AP.

Therefore, the system may combine the refinement of and calibration of the original attribute scores 193. The refinement may include a random-walk on an object-similarity graph and may leverage attribute correlations, and the refinement may improve the accuracy of the attribute scores 193 and improve estimated attribute scores for object images 192 that are missing one or more attribute scores 193. The system may map the attribute scores 193 into a distribution (e.g., Weibull distribution) and may compute the CDF as the attribute-score probabilities of the attribute scores. The transformation from real-value scores to probabilities may make the attribute scores more suitable for the computation of visual similarities.

Figure 4:
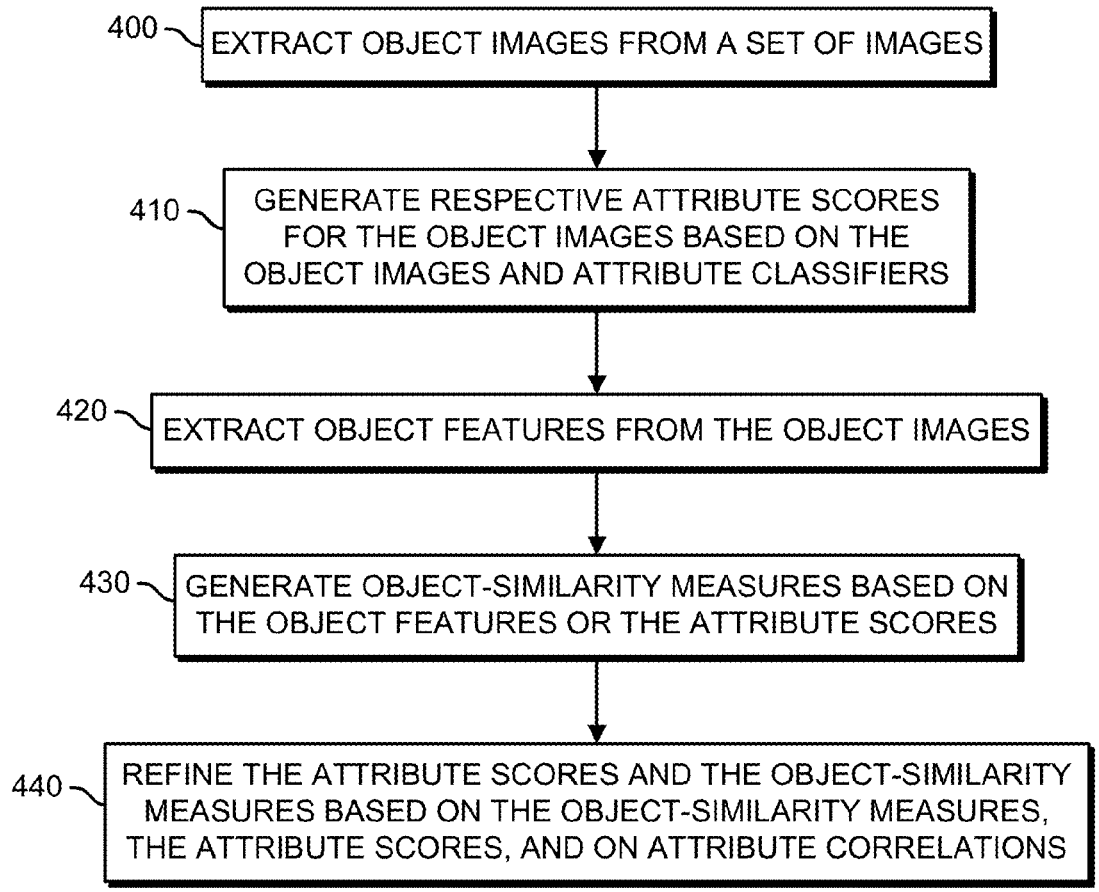
FIG. 4 illustrates an example embodiment of an operational flow for refining attribute scores.

FIG. 4 illustrates an example embodiment of an operational flow for refining attribute scores. The blocks of this operational flow and the other operational flows described herein may be performed by one or more computing devices, for example the systems and devices described herein. Also, although this operational flow and the other operational flows described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of this operational flow and the other operational flows described herein may omit blocks, add blocks, change the order of the blocks, combine blocks, or divide blocks into more blocks.

The flow starts in block 400, where object images are extracted from a set of images. For example, images of faces, birds, or houses may be extracted from a set of images. Next, in block 410, respective attribute scores are generated for the object images based on the object images and on attribute classifiers. The flow then moves to block 420, where object features (e.g., low-level object features) are extracted from the object images. Some embodiments also reduce the dimensionality of the object features. Next, in block 430, object-similarity measures are generated based on one or more of the object features and the attribute scores. Finally, in block 440, the attribute scores and, in some embodiments, the object-similarity measures, are refined based on one or more of the object-similarity measures, the attribute scores, and attribute correlations.

Figure 5:
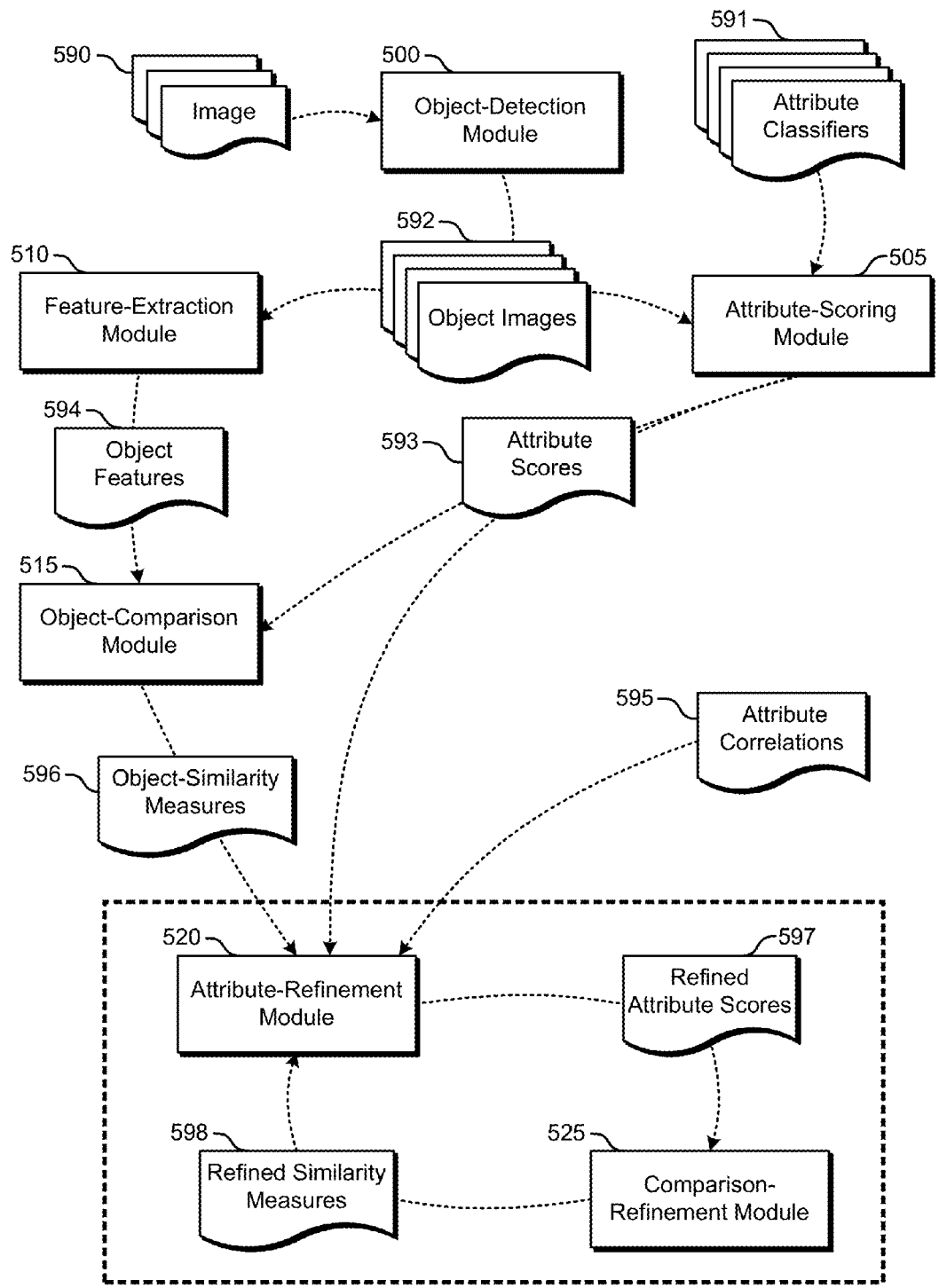
FIG. 5 illustrates an example embodiment of the flow of operations in a system for refining image attributes.

FIG. 5 illustrates an example embodiment of the flow of operations in a system for refining image attributes. For purposes of explanation, FIG. 5 shows only certain modules, although the system includes other components. The system includes one or more computing devices that include an object-detection module 500, an attribute-scoring module 505, a feature-extraction module 510, an object-comparison module 515, an attribute-refinement module 520, and a comparison-refinement module 525.

The object-detection module 500 detects and extracts one or more object images 592 from one or more obtained images 590 (an image 590 may depict two or more objects). The attribute-scoring module 505 generates respective attribute scores 593 (e.g., an attribute-score vector) for each obtained object image 592, and some embodiments generate attribute-score probabilities that are included in the attribute scores 593. The feature-extraction module 510 extracts respective object features 594 (e.g., low-level features) from the object images 592.

The object-comparison module 515 generates object-similarity measures 596 based on the object features 594 (and, in some embodiments, the attribute scores 593). A tight similarity threshold may be selected in order to link each object image 592 with the most-probable near neighbors. The object-comparison module 515 may generate object-similarity scores or generate an object-similarity graph, for example by using conventional methods. Generally, to compute the object-similarity scores, the low-level visual features of a particular object $f_p$, denoted as $VF^{f_p}$, are extracted (e.g., LBP features, HSV features) to represent the object. A dimensionality-reduction technique (e.g., PCA) can be applied to reduce the dimensionality of the low-level visual features $VF^{f_p}$. And then a similarity measurement (e.g., cosine similarities) can be used to compute object-similarity scores between the objects in object pairs based on their low-level visual features VF. Additionally, context information can be used to compute object-similarity measures.

After the object-similarity scores are generated, an object-similarity graph G may be generated. A matrix S describes the similarities between the two objects in all object pairs, with each element $S_{pq}$ indicating the similarity between object image $f_p$ and object image $f_q$. Accordingly, the object-similarity graph G contains m nodes (m is the number of object images 592), with each node representing one object image, and each edge representing the similarity between the corresponding object pairs. Also, in some embodiments, each object node is assigned an attribute-score vector that contains respective attribute scores 593 for the associated object.

Next, the attribute-refinement module 520 generates refined attribute scores 597 based on the object-similarity measures 596, the attribute scores 593, and attribute correlations 595. The comparison-refinement module 525 then obtains the refined attribute scores 597 and generates refined similarity measures 598 based at least in part on the refined attribute scores 597. For example, the comparison-refinement module 525 may use a probabilistic R-LDA model on refined attribute-score probabilities (which may be generated by the attribute-refinement module 520) to project the high-dimensional feature data onto a lower-dimensional subspace that has enhanced discriminative power, and then use the lower-dimensional feature data to re-compute object similarities and generate refined similarity measures 598.

Then in the next iteration, the attribute-refinement module 520 uses the refined similarity measures 598 to generate refined attribute scores 597, and the comparison-refinement module 525 uses the latest refined attribute scores 597 to generate refined similarity measures 598. The attribute-refinement module 520 and the comparison-refinement module 525 repeat these operations (as shown in the broken line block) iteratively until a converging condition is met (e.g., the changes of attribute scores or similarity scores, when compared to last iteration, are less than a threshold), a defined number of maximum iterations have been performed, or another criterion has been satisfied.

Furthermore, some embodiments of the system use regularized linear discriminant analysis (R-LDA) or other techniques to combine low-level features and attribute-score probabilities in order to generate a lower-dimensional representation for object images that best captures the discriminative information between the attributes of the objects.

Figure 6:
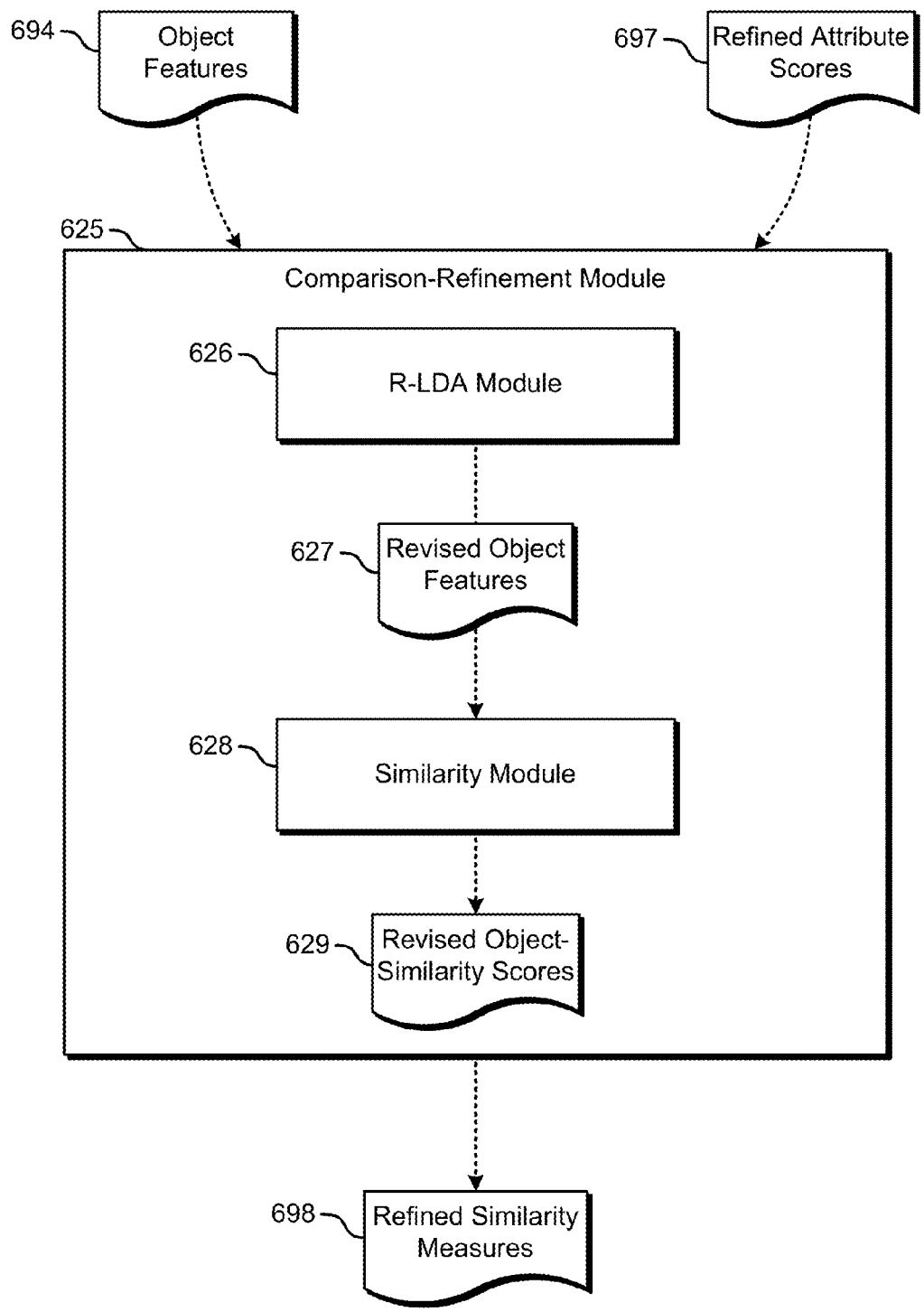
FIG. 6 illustrates an example embodiment of the flow of operations in a system for object-similarity-measure refinement.

FIG. 6 illustrates an example embodiment of the flow of operations in a system for object-similarity-measure refinement. Although the system includes other components, for purposes of explanation FIG. 6 shows only certain modules: a comparison-refinement module 625, an R-LDA module 626, and a similarity module 628. The system combines low-level features and attribute-score probabilities, using R-LDA or other techniques in some embodiments, in order to generate a lower-dimensional representation for object images that captures the discriminative information between the attributes of the object images. R-LDA may be used to project high-dimensional features into a lower-dimensional subspace that includes the discriminative information between different object images. In general, the inputs of the LDA model or the R-LDA model are the high-dimensional input data and class labels, and the output is the projection of a high-dimensional space into lower-dimensional subspace.

This embodiment of the comparison-refinement module 625 uses the refined attribute scores 697 (or unrefined attribute scores) as the class labels and uses the extracted high-dimensional low-level object features 694 as input data to learn an optimal transformation. The R-LDA module 626 obtains the refined attribute scores 697 and uses them to generate attribute-score probabilities if the attribute scores 697 do not include attribute-score probabilities. Thus, this embodiment of R-LDA will work with soft attribute labels (e.g., attribute labels with probabilities that may be between zero and one). The R-LDA module 626 also obtains the object features 694 and generates revised object features 627 based on the attribute-score probabilities and the object features 694. Then the similarity module 628 generates revised object-similarity scores 629 based on the revised object features 627. Also, the comparison-refinement module 625 may generate refined similarity measures 698 based at least on the revised object-similarity scores 629.

For example, the object features 694 may include an n-dimensional visual-feature vector $VF^{f_p}(VF_1^{f_p}, VF_2^{f_p}, \ldots, VF_n^{f_p})$ that was extracted from an object image $f_p$. Based on the refined attribute scores 697 of the object image $f_p$, the comparison-refinement module 625 generates the refined attribute-score probabilities $AP_i^{f_p}(1 \le i \le c)$, which represent the probability that the object image $f_p$ exhibits the $i^{th}$ attribute, and where the total number of attributes is c.

Next, some example embodiments of the R-LDA module 626 calculate an optimal transformation to generate a reduced-dimensional version of the visual-feature vector $VF^{f_p}$ $(VF_1^{f_p}, VF_2^{f_p}, \ldots, VF_n^{f_p})$. Unlike traditional LDA, where a sample is associated with only a single class label in a manner of "hard" assignment, these embodiments use attribute-score probabilities $AP_i^{f_p}(1 \le i \le c)$ as a kind of "soft" label information. An object image $f_p$ can be associated with multiple attributes with strengths assigned by their corresponding attribute-score probabilities $AP_i^{f_p}$. Some embodiments compute the mean vector $u_i$ ($1 \le i \le c$) of all c attributes for m object images for which object features 694 and refined attribute scores 697 have been obtained, for example according to $$u_i = \frac{1}{\sum_{p=1}^{m} AP_i^{f_p}} \sum_{p=1}^{m} AP_i^{f_p} \cdot VF^{f_p}.$$

Also, the mean vector u for the c attributes over the m object images may be calculated according to $$u = \frac{1}{\sum_{i=1}^{c} \sum_{p=1}^{m} AP_i^{f_p}} \sum_{i=1}^{c} \sum_{p=1}^{m} AP_i^{f_p} \cdot VF^{f_p}.$$

Moreover, some embodiments of the R-LDA module 626 generate a between-class scatter matrix $S_b$ and a within-class scatter matrix $S_w$, which may be calculated as follows:

$$S_b = \frac{1}{\sum_{i=1}^{c} \sum_{p=1}^{m} AP_i^{f_p}} \sum_{i=1}^{c} \left( \sum_{p=1}^{m} AP_i^{f_p} \right) (u_i - u)(u_i - u)^T;$$

$$S_w = \frac{1}{\sum_{i=1}^{c} \sum_{p=1}^{m} AP_i^{f_p}} \sum_{i=1}^{c} \sum_{p=1}^{m} AP_i^{f_p} (u_i - VF^{f_p})(u_i - VF^{f_p})^T.$$

Also, some embodiments of the R-LDA module 626 compute a transformation that maximizes the between-class scatter while minimizing the within-class scatter:

$$\varphi = \mathrm{argmax}_\varphi \frac{|\varphi^T S_b \varphi|}{|\varphi^T S_w \varphi|}.$$

Additionally, embodiments of the R-LDA module 626 may find the optimal transformation by solving the following general eigenvalue problem:

$$S_b \phi = \lambda S_w \phi.$$

If the within-class scatter matrix $S_w$ is non-singular, some embodiments compute the eigenvalue of matrix $S_w^{-1} S_b$ and obtain d eigenvectors ($\psi_1, \psi_2, \ldots, \omega_d$) that correspond to the d largest eigenvalues ($1 \le d \le c-1$). Thus the optimal transformation may be $\phi = [\psi_1, \psi_2, \ldots, \psi_d]$. When the within-class scatter matrix $S_w$ is singular, a case sometimes encountered in object recognition, the optimal transformation $\phi$ can be found through a subspace decomposition technique. Given a visual-feature vector $VF^{fp}$ of an object image, the lower-dimensional feature representation $LF^{fp}$ can be computed as follows:

$$LF^{fp} = \psi^T \cdot VF^{fp}.$$

The lower-dimensional feature representation $LF^{fp}$ may be used as the revised object features 627.

Next, the similarity module 628 computes revised object-similarity scores 629 (e.g., object similarities $S_{pq}$ between object $f_p$ and object $f_q$) based on the revised object features 627 (lower-dimensional feature representation $LF^{fp}$ and lower-dimensional feature representation $LF^{fq}$). Many similarity measurements could be used, for example Cosine similarity, Euclidean distance, etc. The comparison-refinement module 625 then generates refined similarity measures 698 based on the revised object-similarity scores 629.

Therefore, by using the R-LDA model, the comparison-refinement module 625 projects the high-dimensional feature data in the object features 694 to a lower-dimensional subspace that maintains discriminative attribute information, and then generates revised object-similarity scores 629 based on the obtained lower-dimensional feature data. Finally, the comparison-refinement module 625 generates refined similarity measures 698 based on the revised object-similarity scores 629.

Figure 7:
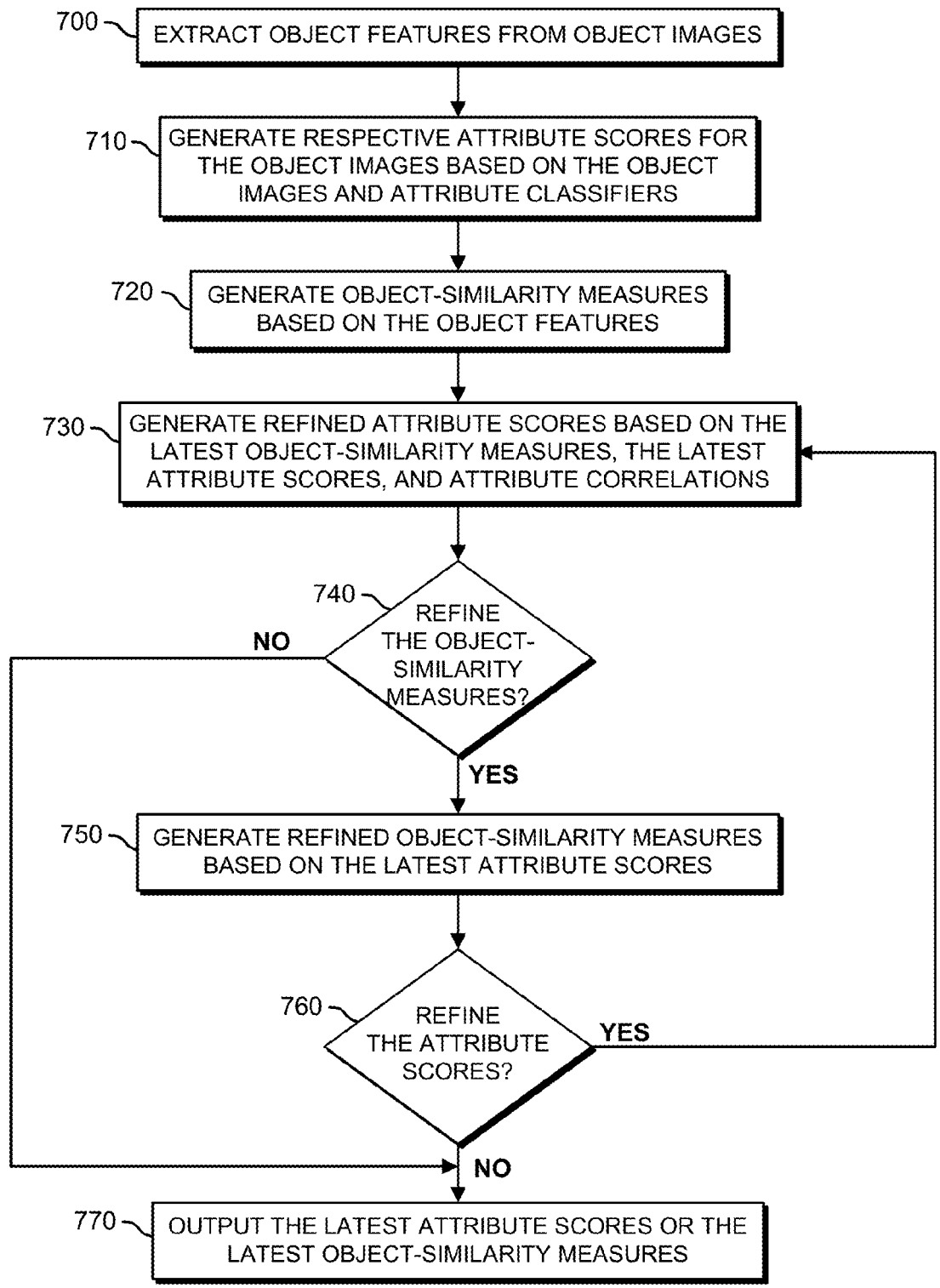
FIG. 7 illustrates an example embodiment of an operational flow for refining attribute scores.

FIG. 7 illustrates an example embodiment of an operational flow for refining attribute scores. The flow starts in block 700, where object features (e.g., high-dimensional, low-level object features) are extracted from object images. The flow then moves to block 710, where respective visual-attribute scores are generated for the object images based on the object images and attribute classifiers. Next, in block 720, object-similarity measures (e.g., an object-similarity graph, object-similarity scores) are generated based on the object features and, in some embodiments, on the attribute scores.

The flow then proceeds to block 730, where refined attribute scores are generated based on the latest object-similarity measures, the latest attribute scores, or attribute correlations. Thus, the first time the operations in block 730 are performed, the latest object-similarity measures will be the object-similarity measures that were generated in block 720, and the latest attribute scores will be the attribute scores that were generated in block 710.

The flow then moves to block 740, where it is determined if the object-similarity measures will be refined. This may include, for example, determining if a predetermined maximum number of iterations has been performed or if a converging condition has been satisfied. If not (block 740=NO), then the flow moves to block 770. If yes (block 740=YES), then the flow moves to block 750, where refined object-similarity measures are generated based on the latest attribute scores, which were generated in block 730.

Next, in block 760, it is determined if the attribute scores will be refined. This may also include, for example, determining if a predetermined maximum number of iterations has been performed or if a converging condition has been satisfied. If no (block 760=NO), then the flow moves to block 770. If yes (block 760=YES), then the flow returns to block 730, where refined attribute scores are generated based on the latest object-similarity measures and, in some embodiments, on the latest attribute scores. If the flow returns to block 730, the latest object-similarity measures will be the refined object-similarity measures that were generated in block 750, and the latest attribute scores will be the refined attribute scores that were generated in the previous iteration of block 730.

Finally, when the flow moves to block 770, the latest attribute scores, which were generated in block 730, or the latest object-similarity measures, which were generated in block 720 or block 750, are output.

Figure 8:
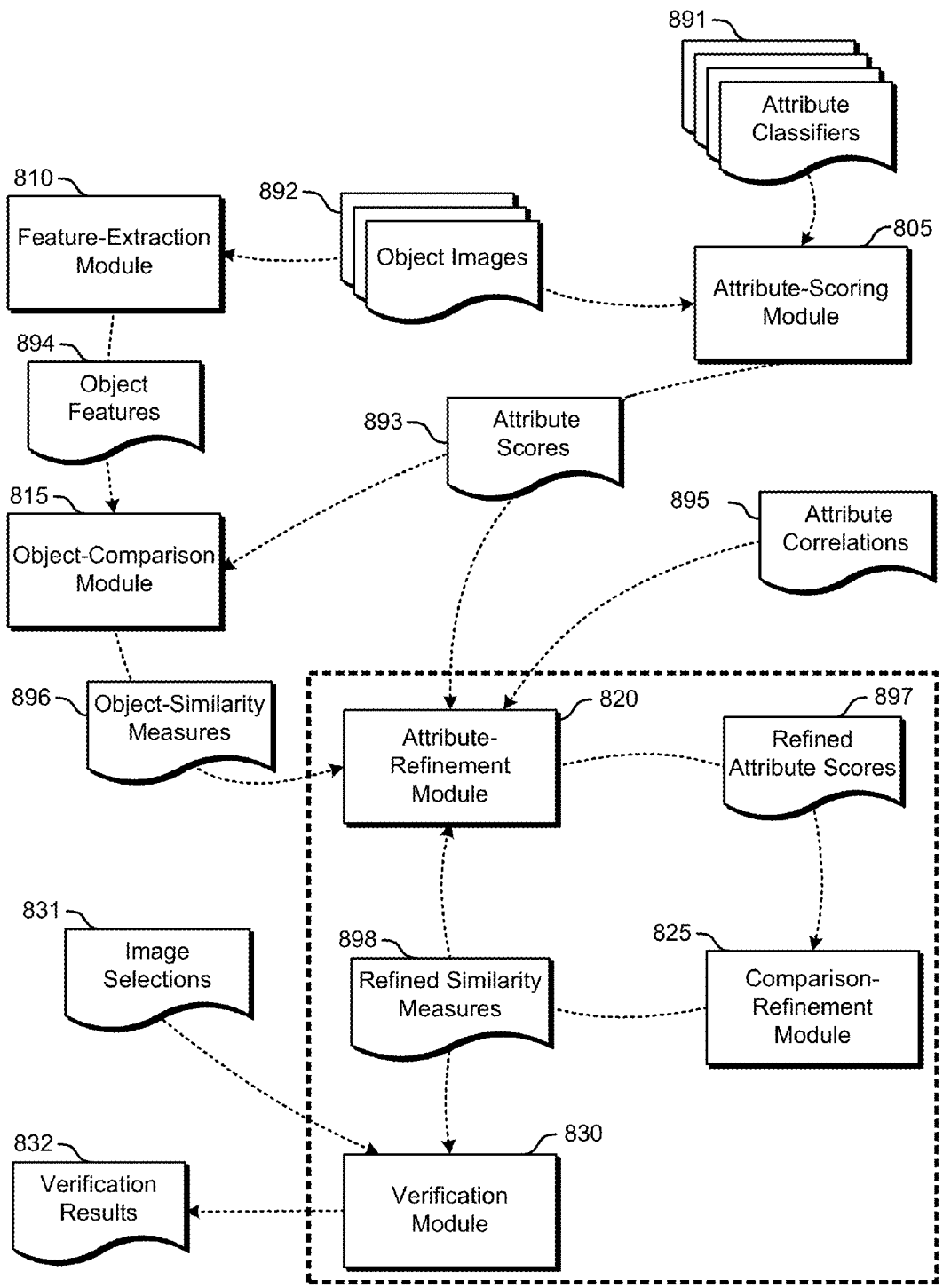
FIG. 8 illustrates an example embodiment of the flow of operations in a system for collaborative object verification.

FIG. 8 illustrates an example embodiment of the flow of operations in a system for collaborative object verification, which determines if two object images are images of the same object (i.e., different images of the same object). For purposes of explanation, FIG. 8 shows only certain modules, although the system includes other components than the illustrated components. The system of FIG. 8 includes one or more computing devices that include an attribute-scoring module 805, a feature-extraction module 810, an object-comparison module 815, an attribute-refinement module 820, a comparison-refinement module 825, and a verification module 830. The feature-extraction module 810 obtains object images 892 and extracts object features 894 from the object images 892. The attribute-scoring module 805 obtains the object images 892 and generates respective attribute scores 893 for the object images 892 based on the object images 892 and attribute classifiers 891.

The object-comparison module 815 obtains the object features 894 and, in some embodiments, the visual-attribute scores 893, and generates object-similarity measures 896 (e.g., object-similarity scores, an object-similarity graph) based on the object features 894 and, in some embodiments, the visual-attribute scores 893. The attribute-refinement module 820 obtains the object-similarity measures 896, attribute correlations 895, and, in some embodiments, the attribute scores 893. The attribute-refinement module 820 generates refined attribute scores 897 for an object image 892 based on one or more of the attribute scores 893, the object-similarity measures 896, and on the attribute correlations 895.

The comparison-refinement module 825 then obtains the refined attribute scores 897 and generates refined object-similarity measures 898 (e.g., refined object-similarity scores, a refined similarity graph) based on the refined attribute scores 897. Then in the next iteration, the attribute-refinement module 820 uses the refined similarity measures 898 to generate refined attribute scores 897 (which may include attribute-score probabilities), and the comparison-refinement module 825 uses the latest refined attribute scores 897 to generate refined similarity measures 898. The attribute-refinement module 820 and the comparison-refinement module 825 may repeat these operations (as shown in the broken line block) iteratively until a converging condition is satisfied (e.g., the changes of attribute scores or similarity scores, when compared to last iteration, are less than a threshold), until a defined maximum number of iterations have been performed, until signaled by the verification module 830, or until another criterion has been satisfied.

The verification module 830 obtains image selections 831, which indicate a target object image 892 and one or more reference object images 892, and generates verification results 832 based on the refined similarity measures 898. The verification results 832 indicate if the target object image 892 depicts the same object as the one or more reference object images 892, in which case the target object image is verified. For example, the verification results 832 may include a binary indicator (e.g., yes or no, 1 or 0) that indicates if the target object image is verified, may include a score (e.g., between 0 and 1) that indicates the probability that the target object image is verified, or may include the latest object-similarity scores between the target object image and the one or more other reference object images. The verification module 830 may receive the refined similarity measures 898 that are generated during the iterations of the operations of the attribute-refinement module 820 and the comparison refinement module 825. The verification module 830 determines if the refined similarity measures 898 satisfy a verification condition, for example a converging condition or a refined similarity measure 898 between the target object image and one or more reference object images that is below or above a threshold. If the condition is satisfied, the verification module 830 outputs the verification results 832.

Figure 9:
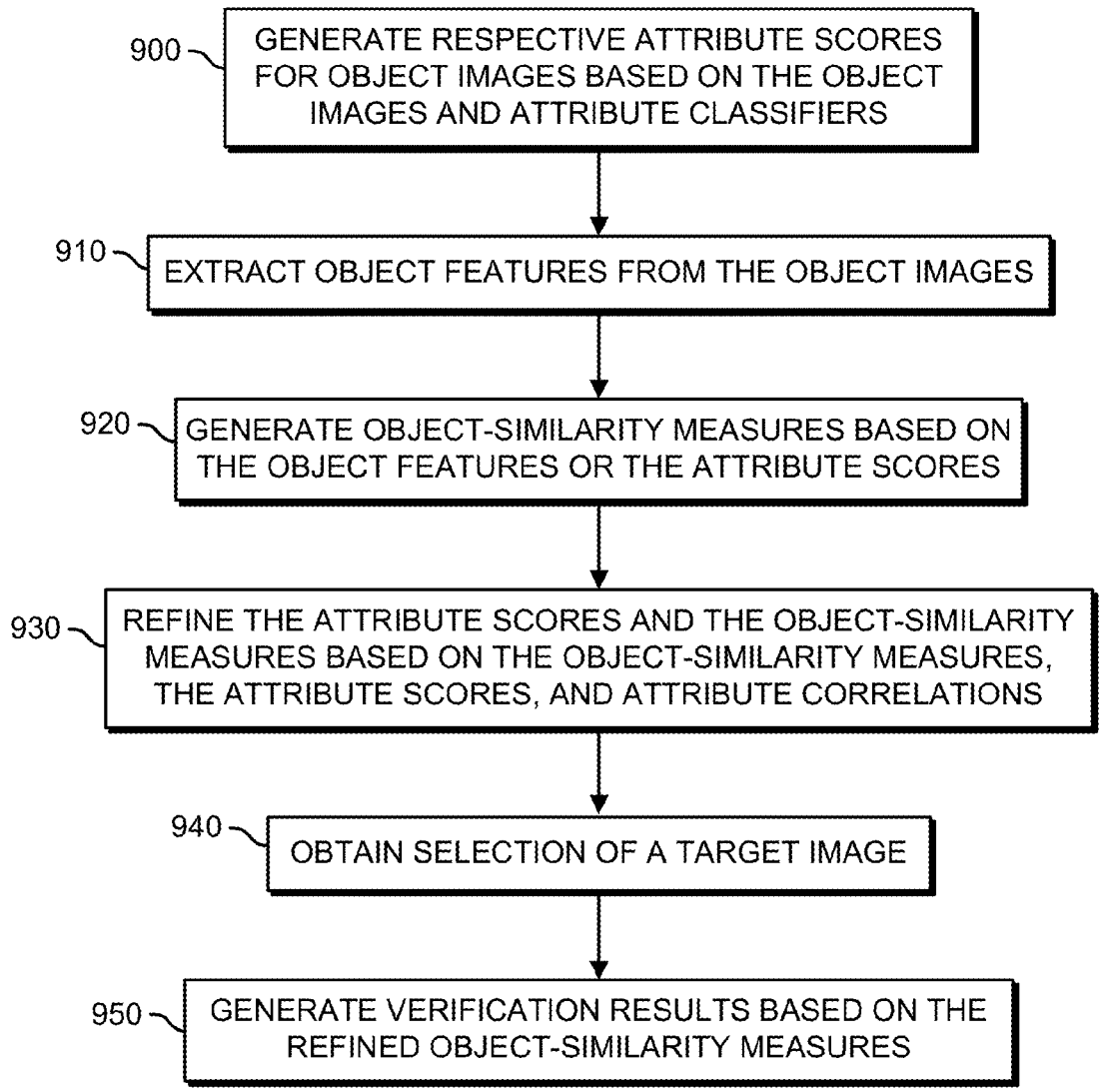
FIG. 9 illustrates an example embodiment of an operational flow for collaborative object verification.

FIG. 9 illustrates an example embodiment of an operational flow for collaborative object verification. The flow starts in block 900, where respective attribute scores are generated for object images based on the object images and on attribute classifiers. The flow then moves to block 910, where object features (e.g., low-level object features) are extracted from the object images. Some embodiments also reduce the dimensionality of the object features. Next, in block 920, object-similarity measures (e.g., an object-similarity graph, object-similarity scores) are generated based on one or more of the object features and the attribute scores. Following, in block 930, the attribute scores and the object-similarity measures are refined based on the object-similarity measures, on the attribute scores, and on attribute correlations. Next, in block 940, a selection of a target object image is obtained. Also, some embodiments obtain selections of one or more reference object images. Finally, in block 950, object verification results are generated based on the refined object-similarity measures. The verification results may indicate, for example, the object images that are most similar to the target image (e.g., in embodiments that do not obtain selections of reference object images), if a similarity of the target object image to the one or more reference images exceeds a threshold, or a probability that the target object image depicts the same object as the one or more reference object images.

Figure 10:
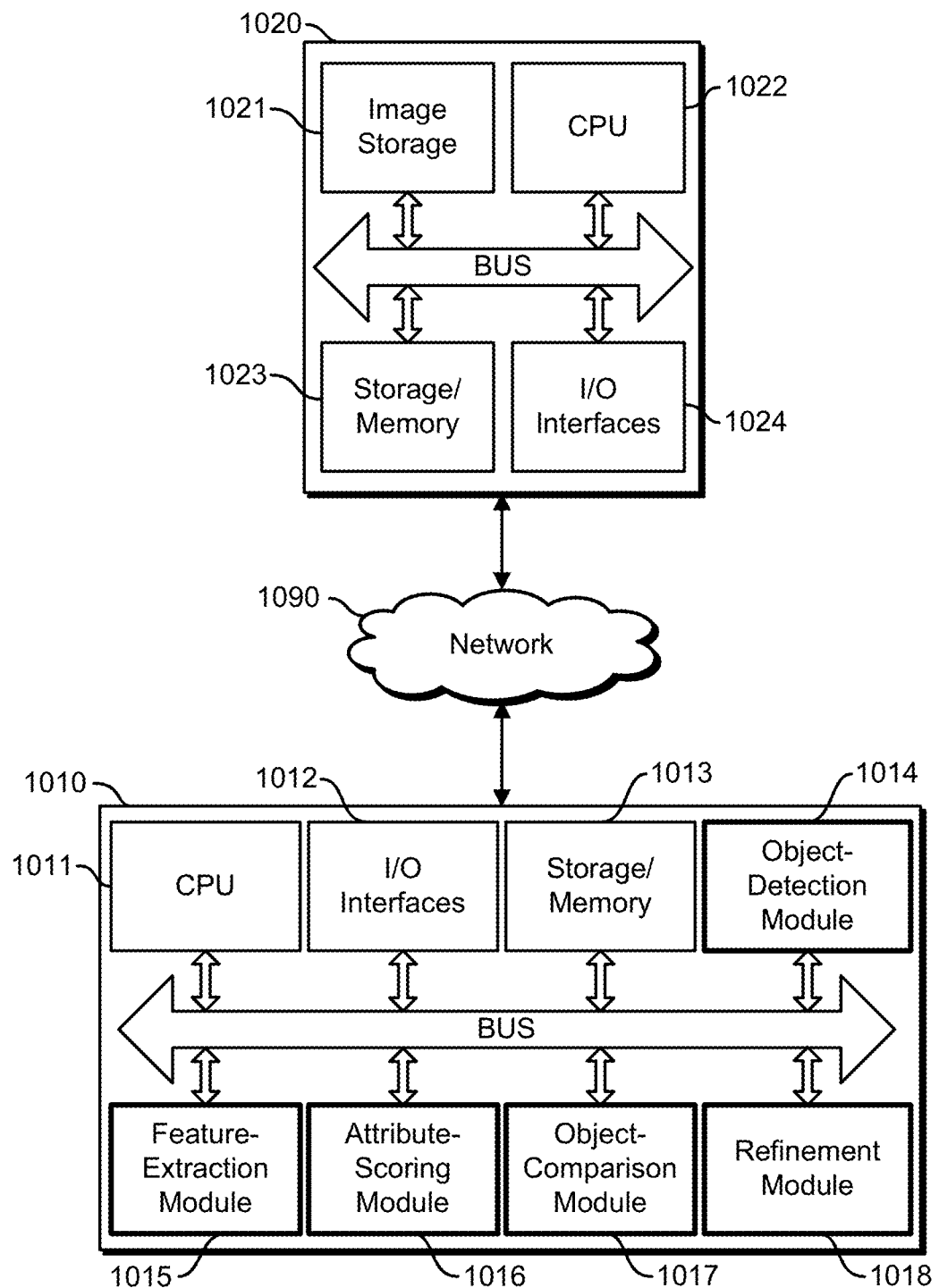
FIG. 10 illustrates an example embodiment of a system for generating refined attribute scores.

FIG. 10 illustrates an example embodiment of a system for generating refined attribute scores. The system includes a refinement device 1010 and an image-storage device 1020. The refinement device 1010 includes one or more processors (CPU) 1011, I/O interfaces 1012, and storage/memory 1013. The CPU 1011 includes one or more central processing units, which include microprocessors (e.g., a single core microprocessor, a multi-core microprocessor) or other circuits, and the CPU 1011 is configured to read and perform computer-executable instructions, such as instructions in storage or in memory (e.g., in modules that are stored in storage or memory). The computer-executable instructions may include those for the performance of the operations described herein. The I/O interfaces 1012 include communication interfaces to input and output devices, which may include a keyboard, a display, a mouse, a printing device, a touch screen, a light pen, an optical-storage device, a scanner, a microphone, a camera, a drive, and a network (either wired or wireless).

The storage/memory 1013 includes one or more computer-readable or computer-writable media, for example a computer-readable storage medium. A computer-readable storage medium, in contrast to a mere transitory, propagating signal, includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage/memory 1013 is configured to store computer-readable data (e.g., an attribute affinity matrix $\mathcal{P}$, attribute classifiers) or computer-executable instructions. The components of the refinement device 1010 communicate via a bus.

The refinement device 1010 also includes an object-detection module 1014, a feature-extraction module 1015, an attribute-scoring module 1016, an object-comparison module 1017, and a refinement module 1018. In some embodiments, the refinement device 1010 includes additional or fewer modules, the modules are combined into fewer modules, or the modules are divided into more modules. The object-detection module 1014 includes computer-readable instructions that, when executed, cause one or more computing devices to detect object images (e.g., images of boats, images of cars, images of faces, images of hats, images of dogs) in a collection of images. The feature-extraction module 1015 includes computer-readable instructions that, when executed, cause one or more computing devices to extract features from images, including the object images.

The attribute-scoring module 1016 includes computer-readable instructions that, when executed, cause one or more computing devices to generate attribute scores (and attribute-score probabilities, in some embodiments) for images (e.g., object images) based on the images and on attribute classifiers. The object-comparison module 1017 includes computer-readable instructions that, when executed, cause one or more computing devices to generate object-similarity measures (e.g., object-similarity scores, object-similarity graphs) based on the images of the objects (e.g., the extracted features from the images of the objects) and, in some embodiments, on attribute scores.

Finally, the refinement module 1018 includes computer-readable instructions that, when executed, cause one or more computing devices to generate refined attribute scores (based on one or more of object-similarity measures, attribute correlations, and previous attribute scores) or to generate refined object-similarity measures (based on one or more of previous object-similarity measures, attribute correlations, and refined attribute scores). In some embodiments, the refinement module 1018 implements the functionality of one or more of the attribute-refinement module 120 in FIG. 1, the attribute-refinement module 520 in FIG. 5, the comparison-refinement module 525 in FIG. 5, the comparison-refinement module 625 in FIG. 6, the attribute-refinement module 820 in FIG. 8, and the comparison-refinement module 825 in FIG. 8.

The image-storage device 1020 includes a CPU 1022, storage/memory 1023, I/O interfaces 1024, and image storage 1021. The image storage 1021 includes one or more computer-readable media that are configured to store images. The image-storage device 1020 and the refinement device 1010 communicate via a network 1090.

Figure 11A:
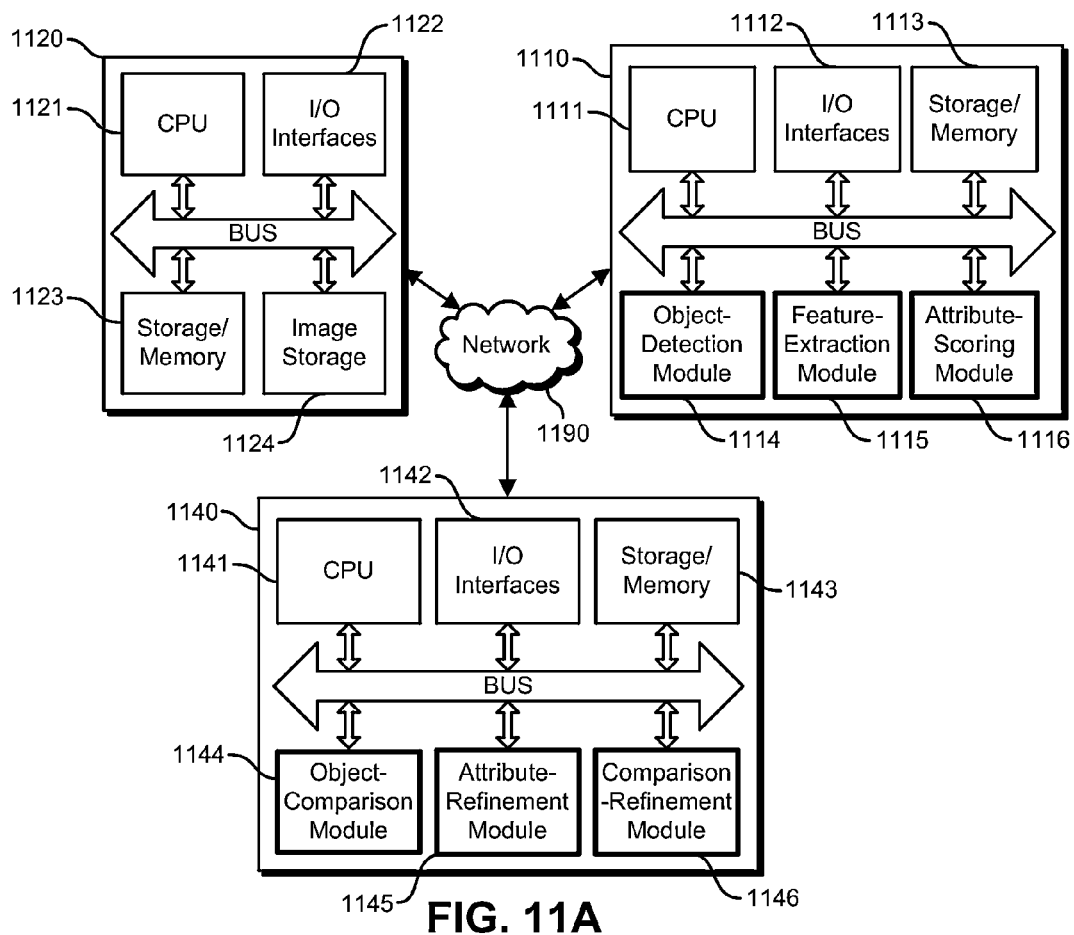
FIG. 11A illustrates an example embodiment of a system for generating refined attribute scores.

FIG. 11A illustrates an example embodiment of a system for generating refined attribute scores. The system includes an image-storage device 1120, an object-detection device 1110, and a refinement device 1140, which communicate via a network 1190. The image-storage device 1120 includes one or more CPUs 1121, I/O interfaces 1122, storage/memory 1123, and image storage 1124. The object-detection device 1110 includes one or more CPUs 1111, I/O interfaces 1112, storage/memory 1113, an object-detection module 1114, a feature-extraction module 1115, and an attribute-scoring module 1116. The refinement device 1140 includes one or more CPUs 1141, I/O interfaces 1142, storage/memory 1143, an object-comparison module 1144, an attribute-refinement module 1145, and a comparison-refinement module 1146.

Figure 11B:
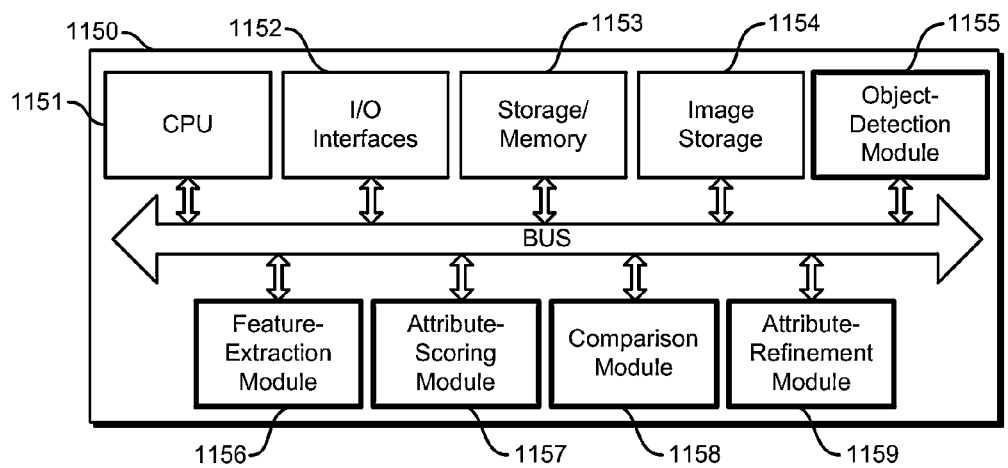
FIG. 11B illustrates an example embodiment of a system for generating refined attribute scores.

FIG. 11B illustrates an example embodiment of a system for generating refined attribute scores. The system includes a refinement device 1150. The refinement device 1150 includes one or more CPUs 1151, I/O interfaces 1152, storage/memory 1153, an image-storage module 1154, an object-detection module 1155, a feature-extraction module 1156, an attribute-scoring module 1157, a comparison module 1158, and an attribute-refinement module 1159. The comparison module 1158 includes computer-readable instructions that, when executed, cause one or more computing devices to generate object-similarity measures based on the images of the objects (and, in some embodiments, on attribute scores) and to generate refined object-similarity measures based on one or more of previous object-similarity measures, attribute correlations, and refined attribute scores. In some embodiments, the comparison module 1158 implements the functionality of one or more of the object-comparison module 115 in FIG. 1, the object-comparison module 515 in FIG. 5, the comparison-refinement module 525 of FIG. 5, the comparison-refinement module 625 of FIG. 6, the object-comparison module 815 in FIG. 8, and the comparison-refinement module 825 of FIG. 8. Thus, in this example embodiment of the refinement device 1150, a single device performs all the operations and stores all the applicable information. Furthermore some embodiments of the refinement device include a verification module.

Figure 14:
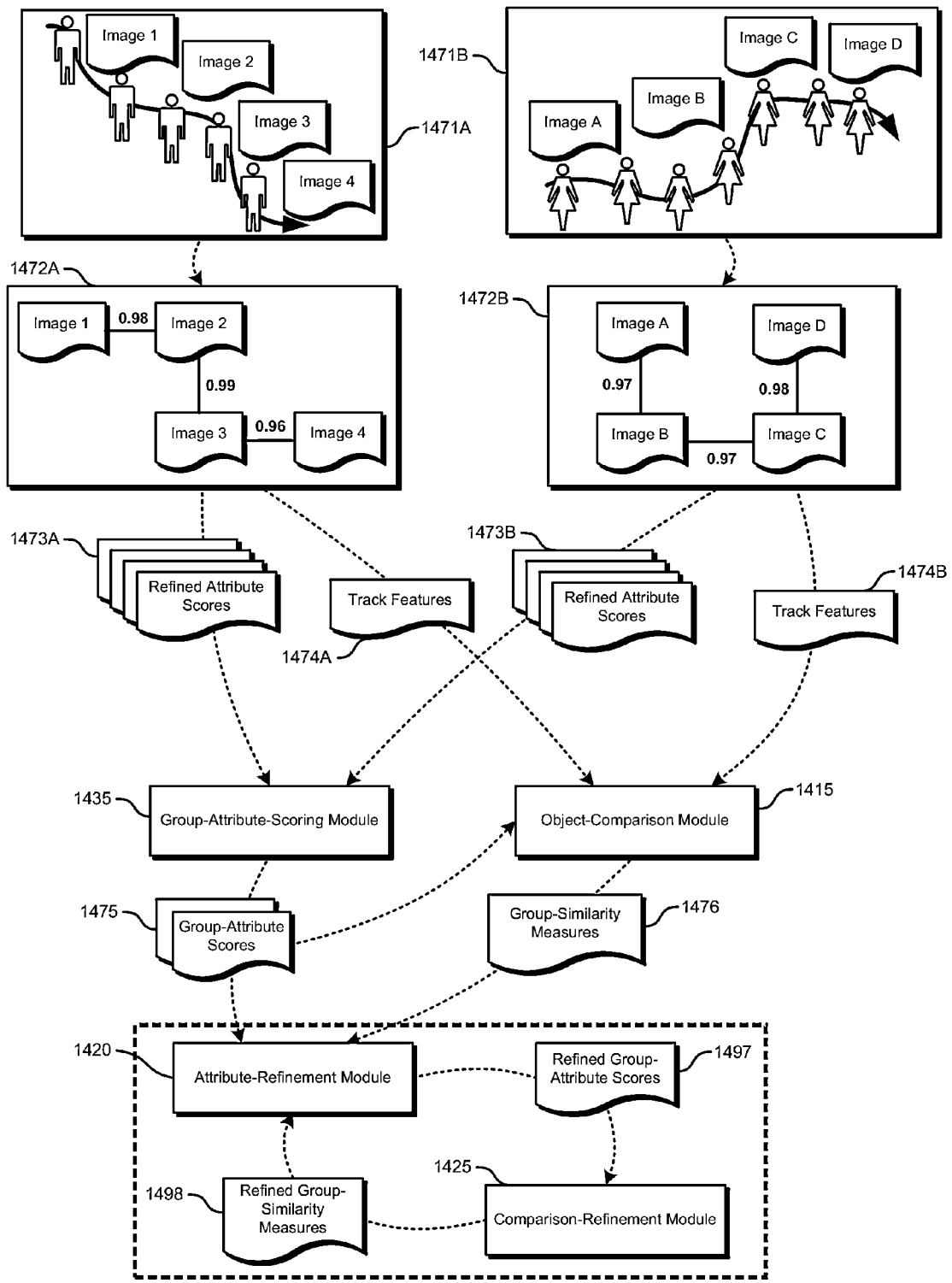
FIG. 14 illustrates an example embodiment of the flow of operations in a system for refining image attributes.

FIG. 14 illustrates an example embodiment of the flow of operations in a system for refining image attributes. The system operates on groups of object images 1471, for example, a first group of object images 1471A that includes object images 1-4 and a second group of object images 1471 that includes object images A-D. In some embodiments, a group of object images 1471 is a track that is derived from a plurality of images, for example a video. The object images in the track show the movement of an object (e.g., a human, an automobile) through the field of view of the camera. The group-attribute scores can themselves be estimated from the frame-by-frame object-image attribute scores of the individual object images in the group of object images.

Because the object in the individual object images of these groups of object images 1471 (e.g., a track) can be assumed to be the same object, object-similarity measures 1472 for the individual object images in a group of object images can be generated based on the assumption that the objects in sequential object images are the same object. For example, for the individual object images in the first group of images 1471A, object-similarity measures 1472A are generated, and the object-similarity measures 1472A of the illustrated embodiment include an object-similarity graph. The sequential object images in the group of object images 1471A are assumed to show the same object, and therefore the edge values in the object-similarity graph show a strong similarity between the adjacent object images. This may allow the system to account for changes in the view of the object (e.g., as the object rotates, moves by, changes expression), which may influence the attribute-score estimates of the individual object images.

Respective attribute scores are generated for each individual object image in the groups of object images 1471. Then refined attribute scores 1473 are generated for each individual object image in the groups of object images 1471, for example using the systems and operations illustrated in FIG. 1 and FIGS. 4-9. Accordingly, the refined attribute scores 1473B for the individual object images in the second group of object images 1471B includes refined attribute scores 1473 for image A, refined attribute scores 1473 for image B, refined attribute scores 1473 for image C, and refined attribute scores 1473 for image D.

A group-attribute-scoring module 1435 obtains the refined attribute scores 1473 and generates group-attribute scores 1475 based on the refined attribute scores 1473. The group-attribute scores 1475 indicate the attribute scores of the individual object images in a group of object images 1471 as a collective. Thus, the group-attribute scores 1475 for the object images in the first group of object images 1471A include attribute scores for the first group of object images 1471A as a collective, but not for each individual object image in the first group of object images 1471A. The group-attribute scores 1475 may be generated, for example, by finding a weighted mean or a median of the refined attribute scores 1473 of the individual object images in a group of object images 1471, by using the most confident estimate in the group, and by using a maximum likelihood or maximum a posteriori estimate of the attributes based on attribute statistical models. For example, the group-attribute score 1475 for the attribute 'blond hair' for the first group of object images 1471 may be generated by averaging the 'blond hair' attribute scores of images 1-4. Thus, the group-attribute scores 1475 may represent the attribute scores of a group of object images 1471 as if the group of object images 1471 was a single object image. For example, a single attribute-score vector may be generated for a group of object images 1471 based on the attribute-score vectors of the individual object images in the group of object images 1471.

Additionally, the system generates respective group features 1474 for each group of object images. The group features 1474 may be low-level features and may be generated by finding a centroid of the low-level features of the individual object images in the respective group of object images 1474, by selecting the low-level features that are closest to one or more centroids of the low-level features, by using low-level multi-image features (e.g., a human gait descriptor), by using a fisher vector created from individual low-level features from object images in the track, etc. Accordingly, the group features 1474 may represent the object features of a group of object images 1471 as if the group of object images 1471 was a single object image. Also, the object-comparison module 1415 generates group-similarity measures 1415 based on the group features 1474 and, in some embodiments, on the group-attribute scores 1475. For example, the group-similarity measures 1415 may be generated based at least in part on one or more of tracker confidence, image quality, and visual similarity.

Furthermore, the attribute-refinement module 1420 generates refined group-attribute scores 1497 for the groups of object images 1471 and the comparison-refinement module 1425 generates refined group-similarity measures 1498 for the groups of object images 1471. Thus, the system of FIG. 14 can refine the group-attribute scores and group-similarity measures of groups of object images (e.g., video, series of photos) as if each of the groups of object images was a single object image. For example, the group-attribute scores 1475 can be used as the attribute scores 193 in FIG. 1, the attribute scores 593 in FIG. 5, and the attribute scores 893 of FIG. 8. Also for example, the group features 1474 can be used as the object features 194 in FIG. 1, the object features 594 in FIG. 5, and the object features 894 in FIG. 8.

Figure 15:
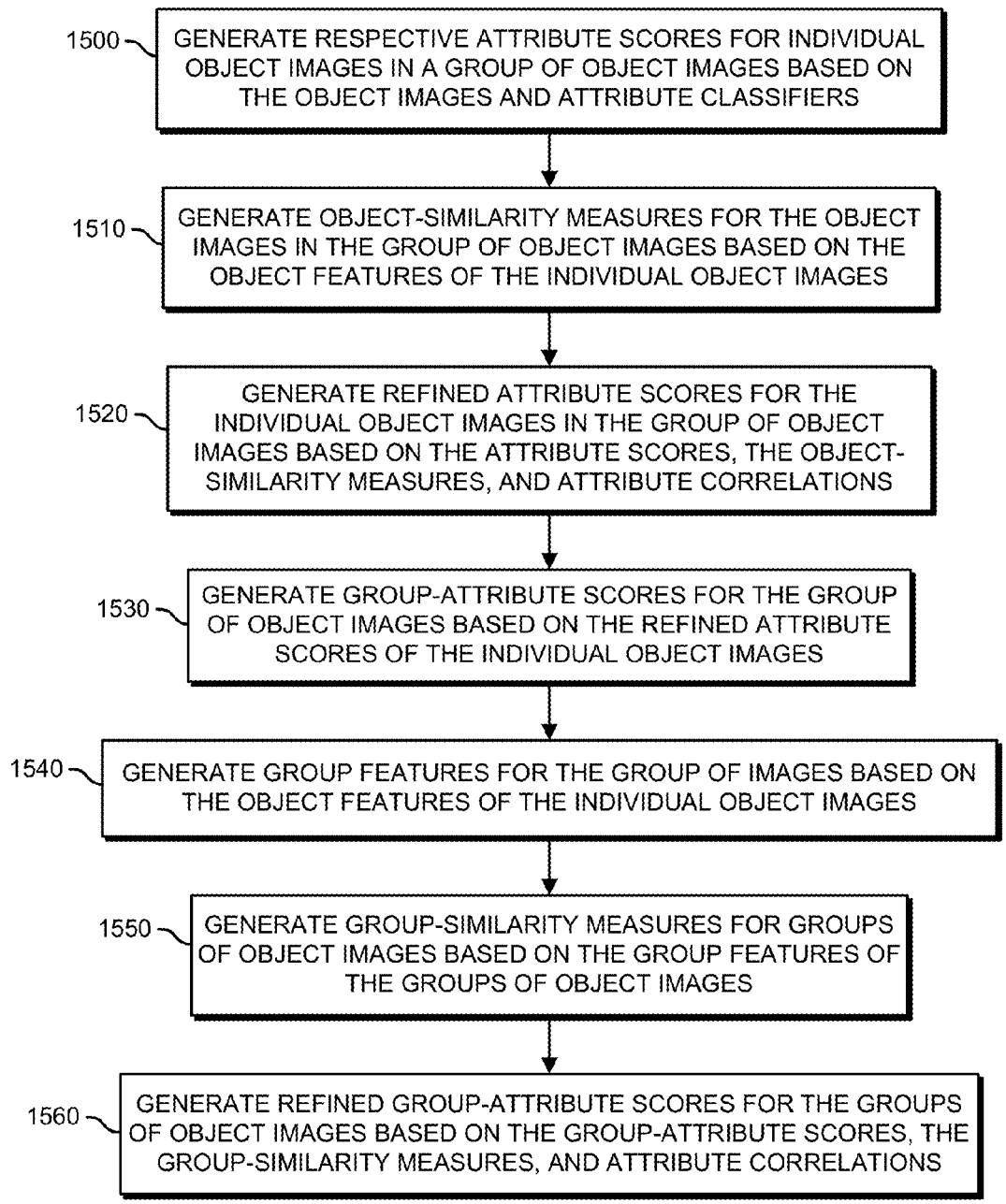
FIG. 15 illustrates an example embodiment of an operational flow for refining attribute scores.

FIG. 15 illustrates an example embodiment of an operational flow for refining attribute scores. In block 1500, respective attribute scores are generated for individual object images in a group of object images based on the individual object images and attribute classifiers. Next, in block 1510, object-similarity measures are generated for the individual object images in the group of object images based on the object features of the individual object images. The flow then moves to block 1520, where refined attribute scores are generated for the individual object images in the group of object images based on the attribute scores of the individual object images, the object-similarity measures of the individual object images, and attribute correlations.

Following, in block 1530, group-attribute scores are generated for the group of object images based on the refined attribute scores of the individual object images in the group of object images. Also, in block 1540, group features are generated for the group of object images based on the object features of the individual object images in the group of object images. Next, in block 1550, group-similarity measures for groups of object images are generated based on the group features of the groups of object images. The flow then proceeds to block 1560, where respective refined group-attribute scores for the groups of object images are generated based on the respective group-attribute scores of the groups of object images, the group-similarity measures of the groups of object images, and attribute correlations. Furthermore, similar to other embodiments described herein (e.g., in FIG. 5, FIG. 7, and FIG. 8), some embodiments of the operational flow also generate refined group-similarity measures for the groups of object images, and then iteratively generate refined group-attributes scores and refined group-similarity measures for the groups of object images.

The above-described devices, systems, and methods can be implemented by providing one or more computer-readable media that contain computer-executable instructions for realizing the above-described operations to one or more computing devices that are configured to read and execute the computer-executable instructions. Thus, the systems or devices perform the operations of the above-described embodiments when executing the computer-executable instructions. Also, an operating system on the one or more systems or devices may implement at least some of the operations of the above-described embodiments. Thus, the computer-executable instructions or the one or more computer-readable media that contain the computer-executable instructions constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and semiconductor memory (including flash memory, DRAM, SRAM, a solid state drive, EPROM, EEPROM)) can be employed as a computer-readable medium for the computer-executable instructions. The computer-executable instructions may be stored on a computer-readable storage medium that is provided on a function-extension board inserted into a device or on a function-extension unit connected to the device, and a CPU provided on the function-extension board or unit may implement at least some of the operations of the above-described embodiments.

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A method for refining attribute scores, the method comprising:
    obtaining a plurality of object images;
    generating a respective first attribute score of a first attribute for each object image in the plurality of object images based on the respective object image and an attribute classifier;
    calculating a respective pairwise object-similarity measure for pairs of object images in the plurality of object images by comparing image features; and
    refining the first attribute score of a processing target object image based on an attribute score of an object image that is highly similar, based on the respective pairwise object-similarity measure, to the processing target object image.

2. The method of claim 1, further comprising:
    generating an object-similarity relation based at least in part on the pairwise object-similarity measures,
    wherein refining the first attribute score of the processing target object image includes performing a random walk on the object-similarity relation.

3. The method of claim 1, further comprising
    generating a second attribute score of a second attribute for each object image in the plurality of object images based on the object images,
    wherein refining the first attribute score of the processing target object image is further based on a correlation of the first attribute and the second attribute.

4. The method of claim 3, further comprising
    refining the second attribute score of the processing target object image based on the correlation of the first attribute and the second attribute, on the attribute scores of the other object images in the plurality of object images, and on the pairwise object-similarity measures of the pairs of object images in the plurality of object images.

5. The method of claim 1, further comprising
    generating refined pairwise object-similarity measures for the pairs of object images; and
    further refining the first attribute score and a second attribute score of an object image based at least in part on refined attribute scores of other object images in the plurality of object images and on the refined pairwise object-similarity measures of the pairs of object images.

6. The method of claim 5, wherein generating the refined pairwise object-similarity measures for the pairs of object images includes projecting high-dimensional features of the object images to a lower-dimensional space.

7. A system for refining attribute scores, the system comprising:
    a computer-readable storage medium; and
    one or more processors that are coupled to the computer-readable storage medium and that are configured to cause the system to
        generate respective attribute scores of a plurality of attributes for each object image in a plurality of object images based on the object images and on attribute classifiers,
        generate respective pairwise object-similarity measures for pairs of object images in the plurality of object images by comparing image features, and
        generate refined attribute scores of target object images based on the attribute scores of respective object images in the plurality of object images that, as indicated by the pairwise object-similarity measures, are highly similar to the target object images.

8. The system of claim 7, wherein the one or more processors are further configured to cause the system to generate the refined attribute scores further based on attribute correlations of the plurality of attributes.

9. The system of claim 8, wherein the one or more processors are further configured to cause the system to generate refined pairwise object-similarity measures for the pairs of object images in the plurality of object images based on the refined attribute scores.

10. The system of claim 9, wherein the one or more processors are further configured to cause the system to generate further-refined attribute scores of the object images based on the refined attribute scores of the object images and on the refined pairwise object-similarity measures of the pairs of object images.

11. The system of claim 10, wherein the one or more processors are further configured to cause the system to generate further-refined attribute scores and further-refined pairwise object-similarity measures until a convergence condition is satisfied.

12. The system of claim 7, wherein the one or more processors are further configured to cause the system to generate an object-similarity graph based on the pairwise object-similarity measures.

13. The system of claim 7, wherein the one or more processors are further configured to cause the system to retrieve a target object image based on the refined attribute scores of the target object image.

14. The system of claim 13, wherein, to retrieve the target object image based on the refined attribute scores of the target object image, the one or more processors are further configured to cause the system to weight the refined attribute scores of the target object image.

15. One or more computer-readable storage media storing instructions that, when executed by one or more computing device, cause the one or more computing devices to perform operations comprising:
   generating respective attribute scores of a plurality of attributes for each object image in a plurality of object images based on the object images and on attribute classifiers;
   generating respective pairwise object-similarity measures for pairs of object images in the plurality of object images by comparing image features; and
   generating refined attribute scores of target object images based on one or more of the attribute scores of respective object images that, as indicated by the pairwise object-similarity measures, are highly similar to the target object images.

16. The one or more computer-readable storage media of claim 15, wherein the refined attribute scores are generated further based on attribute correlations of the plurality of attributes, and
   wherein the attribute correlations are correlations of stable attributes or persistent attributes.

17. The one or more computer-readable storage media of claim 16, wherein the attribute correlations are defined by an attribute-affinity matrix.

18. The one or more computer-readable storage media of claim 15, wherein the operations further comprise generating respective attribute-score probabilities for the plurality of attributes for each object image.

19. The one or more computer-readable storage media of claim 15, wherein the operations further comprise:
   iteratively generating further-refined attribute scores of the object images based at least on previous attribute scores of the object images in the plurality of object images,
   wherein the previous attribute scores are the refined attribute scores in a first iteration of generating the further-refined attribute scores.

20. The one or more computer-readable storage media of claim 19, wherein iteratively generating the further-refined attribute scores includes projecting the previous attribute scores to an attribute-score subspace.

* * * * *